(12) United States Patent
Ivchenko et al.

(10) Patent No.: US 7,376,760 B1
(45) Date of Patent: May 20, 2008

(54) METHODS AND APPARATUS TO SUPPORT ACQUISITION OF DATA

(75) Inventors: Olexiy Ivchenko, Stoughton, MA (US); Denys L. Kraplin, Holliston, MA (US)

(73) Assignee: United Electronic Industries, Canton, MA (US)

( * ) Notice: Subject to any disclaimer, the term of this patent is extended or adjusted under 35 U.S.C. 154(b) by 468 days.

(21) Appl. No.: 10/789,454

(22) Filed: Feb. 27, 2004

Related U.S. Application Data

(60) Provisional application No. 60/450,745, filed on Feb. 28, 2003.

(51) Int. Cl.
*G06F 3/00* (2006.01)
*G06F 13/12* (2006.01)

(52) U.S. Cl. .................. 710/8; 710/5; 710/15; 710/62; 702/108

(58) Field of Classification Search ...................... None
See application file for complete search history.

(56) References Cited

U.S. PATENT DOCUMENTS

| | | | |
|---|---|---|---|
| 5,878,033 A | 3/1999 | Mouly | 370/312 |
| 5,966,166 A | 10/1999 | Coutinho et al. | 348/14.1 |
| 6,236,855 B1 | 5/2001 | Austin | 455/423 |
| 6,487,457 B1 | 11/2002 | Hull et al. | 700/17 |
| 6,757,522 B1 | 6/2004 | Naegeli et al. | 455/67.11 |
| 2002/0177974 A1* | 11/2002 | Ting et al. | 702/150 |
| 2002/0186245 A1* | 12/2002 | Chandhoke et al. | 345/764 |
| 2003/0040881 A1* | 2/2003 | Steger et al. | 702/123 |

* cited by examiner

*Primary Examiner*—Alan S. Chen
(74) *Attorney, Agent, or Firm*—Barry W. Chapin, Esq.; Chapin IP Law, LLC

(57) ABSTRACT

A controller in a computer communicates with multiple data acquisition nodes over a network connection. The controller plugs into a personal computer device that processes received data and generates commands over a network cable extending from the controller to a first data acquisition node. The first data acquisition node couples, via a network cable, to a second data acquisition node. The second data acquisition node optionally couples to yet other data acquisition nodes, and so on in a daisy-chain fashion. Each data acquisition node includes one or more interfaces to corresponding input/output devices associated with the data acquisition node. Based on the interconnection of the controller and the data acquisition nodes, the controller accesses data collected by the data acquisition nodes from corresponding input devices and additionally controls output devices coupled to the data acquisition nodes.

14 Claims, 13 Drawing Sheets

METHODS AND APPARATUS TO SUPPORT ACQUISITION OF DATA

RELATED APPLICATION

This application is related to and claims the benefit of earlier filed U.S. Provisional Patent Application Ser. No. 60/450,745 entitled "METHODS AND APPARATUS FOR PROVIDING DATA ACQUISITION CUBE AND OPERATION,", filed on Feb. 28, 2003, the entire teachings of which are incorporated herein by this reference. Pending U.S. patent application Ser. No. 10/187,186 entitled "METHODS AND APPARATUS FOR PERFORMING DATA ACQUISITION AND CONTROL,", filed on Jul. 1, 2002, the entire teachings of which are incorporated herein by this reference.

BACKGROUND

Many conventional automation control and data acquisition systems include remotely located controllers that receive information from, for example, corresponding remotely located sensor devices that monitor parameters such as temperature, pressure, light intensity, etc. In general, the controller typically collects and processes the acquired data to perform some further action. For example, in the context of a simple application such as a process of bottling soda, a sensor device may be employed at a remote location with respect to the controller to detect when a bottle of soda has been filled to a proper level. To start the filling process, the central controller may activate a dispenser to begin filling the empty bottle. Upon detecting when the bottle becomes filled to a predetermined capacity, the sensor device sends a "full bottle" signal to the central controller. In response to receiving the "full bottle" signal, the central controller sends a "shut-off" command to the dispenser to discontinue filling the bottle so that the soda bottle is not filled beyond capacity.

Conventional data acquisition and control systems may be much more complex than the bottling process as described above. For example, processes associated with semiconductor fabrication are typically quite complex. Such processes normally include i) controlling a complex arrangement of heating and cooling machinery, ii) controlling semiconductor wafer conveyance systems, iii) controlling chemical vapor deposition system hardware (e.g., valves, gas and pressure measurement devices, thermocouples, and the like), iv) controlling wafer handling machines, etc. Each element (i.e., each temperature sensing device, valve, mechanical manipulator, pressure sensor, thermocouple, etc.) in the semiconductor fabrication system typically includes an attached sensing and/or control device capable of reading and writing data (e.g., analog and/or digital control signals) to and from the element. A central controller precisely controls the operation of various elements in the system to allow the elements to work together in a prescribed manner to support fabrication of semiconductor devices.

In certain conventional data acquisition systems such as those discussed above as well as many other applications, the sensor and control devices are remotely located with respect to a central controller. The central controller typically communicates with the sensor and control devices via a network link such as that provided by a wire or wireless network. For example, the central controller typically exchanges data with the sensing and control devices using a standardized network protocol such as the Transmission Control Protocol (TCP) and Internet Protocol (IP) or TCP/IP. TCP/IP provides a reliable mechanism to exchange packets of data between the processing unit and control devices without having to worry about loss of data packets or networking transmission errors.

SUMMARY

Conventional techniques of acquiring data or controlling remote nodes suffer from certain deficiencies. For example, conventional data acquisition systems require that remote input (e.g., sensors) and output devices (automation control devices) be coupled to a personal computer that is, in turn, coupled to a network device. Such an arrangement may be quite expensive and bulky to implement because a personal computer is required at each location there is an input or output device that must be controlled or accessed over a network. Delays in the network and corresponding network interfaces of conventional data acquisition and control systems limit their usefulness because many applications require real-time or near real-time responsiveness. Additionally, excessive cable lengths to corresponding sensor devices in conventional systems reduce the overall accuracy of sensor measurements which potentially reduces fabrication yields.

A specific embodiment of the invention involves use of a controller that communicates with multiple data acquisition nodes over a network connection. The controller plugs into a personal computer device that processes received data and generates commands over a network cable extending from the controller to a first data acquisition node. Typically, the personal computer hosts an application for collecting and processing received data and generating control commands. The first data acquisition node couples, via a network cable, to a second data acquisition node. The second data acquisition node optionally couples to yet other data acquisition nodes, and so on in a daisy-chain fashion. The controller communicates with data acquisition nodes in the network.

Each data acquisition node includes an interface to corresponding input/output devices associated with the data acquisition node. For example, the data acquisition node includes an interface to receive data from an input device such as a sensor (e.g., sensor devices that detect temperature, pressure, position, etc.). The data acquisition node processes the data retrieved from the sensors and forwards collected data over the network cable to the controller via network messages. In a reverse direction, the controller generates control messages over the network to the data acquisition nodes and, more particularly, output devices (e.g., motors, solenoids, relays, etc.) associated with the data acquisition nodes.

Use of the data acquisition and control system including distributed data acquisition nodes configured according to the principles of the present invention promotes higher speed data collection, provides more accurate data collection, simplifies the data collection process, reduces system maintenance, reduces a bulkiness of the data acquisition nodes, increases system reliability, etc. over conventional systems.

In view of the foregoing discussion and detailed description of the invention that follows, one embodiment of the invention (among other general embodiments of the invention) is directed towards a data acquisition node supporting acquisition of data. Internally, the data acquisition node includes multiple circuit boards that, when interconnected, form an assembly (e.g., a rigid assembly) of successively stacked circuit boards. At least one circuit board and a corresponding adjacent circuit board in the assembly include connector interfaces to directly and electrically couple the at least one circuit board to an adjacent circuit board in the assembly. Thus, the multiple circuit boards in the assembly couple amongst each other via their corresponding connector interfaces. Externally, the data acquisition node includes a housing that slidably receives the rigid assembly of successively stacked circuit boards. In the housing, the rigid assembly of successively stacked circuit boards includes a power circuit board operable to provide power to at least one other circuit board in the rigid assembly. For example, the power circuit board receives a power input signal, conditions the power input signal and distributes power to one or more other circuit boards in the assembly.

A data acquisition node according to an embodiment of the invention provides benefits over those in conventional data acquisition systems. For example, there is no need for inclusion of a separate and distinct backplane in the housing for providing connectivity among the rigid assembly of circuit boards because the connector interfaces on the multiple circuit boards provide interconnectivity amongst each other. Further, stacking of circuit boards (as opposed to a single, large circuit board) enhances a form factor associated with the housing. For example, stacking circuit boards enables the housing to be substantially cube-like or rectangular-like. Such a housing form factor is advantageous during field use because a cube-like housing can include a high density of external connectors on any of its faces (e.g., height-wise) compared to conventional pancake-shaped housings that house only a single large circuit board.

In further embodiments and yet other independent embodiments of the invention, the housing includes slots for slidably receiving edges of circuit boards in the assembly of stacked circuit boards. Edges of the circuit boards (e.g., where the circuit boards contact the housing) include heat sink regions that supports thermal conduction between the rigid assembly and the housing. In one application, the heat sink regions are multiple patches of electrically conductive material disposed on separate layers of a corresponding circuit board of the assembly. Vias or barrels through the multiple regions of conductive material on layers of the circuit boards further enhance conduction of heat from the rigid assembly of circuit boards to the slots of the housing.

In one embodiment, the rigid assembly of stacked circuit boards in the data acquisition node includes i) a first circuit board (e.g., a network interface board) including a network interface circuit supporting communication over a network link, ii) a second circuit board (e.g., an I/O circuit board) including an input interface circuit operable to acquire data associated with signals received from an external source with respect to the data acquisition node, and iii) a processor board disposed between the first circuit board and the second circuit board. The processor board receives the acquired data from the second circuit board and initiates communication of the acquired data through the network interface over the network link.

In another embodiment, the rigid assembly of successively stacked circuit boards further includes an input interface circuit operable to acquire data associated with signals received from an external source with respect to the data acquisition node. For example, an input interface (e.g., on an I/O (Input/Output) board) of the assembly of circuit boards includes an interface to receive signals from a sensor device. The I/O board forwards data collected from the sensor device to a processor board in the assembly which, in turn, generates data packets including sensor device data. The processor device forwards the data packets to the network interface for transmission over the network.

In another embodiment, the power circuit board of the rigid assembly includes a first power connector for receiving an input power signal and a second connector for daisy-chaining power to other downstream data acquisition nodes. Thus, in the context of a data acquisition system including multiple daisy-chained data acquisition nodes, a first data acquisition node in a chain of multiple daisy-chained nodes receives power on the first power connector and forwards power out the second power connector to other data acquisition nodes in the chain.

With respect to a given data acquisition node, the power circuit board in the assembly of stacked circuit boards includes a voltage converter for converting a primary power signal received from an external power source into a secondary power signal distributed to other circuit boards in the rigid assembly. The power circuit board is optionally configured to provide power to all or a portion of other circuit boards in the rigid assembly of successively stacked circuit boards. For example, a first data acquisition node in a chain of multiple daisy-chained nodes receives power on the first power connector, converts the power and then forwards the power out the second power connector to other data acquisition nodes in the chain.

As discussed, the data acquisition node includes a housing to slidably receive a rigid assembly of interconnected or stacked circuit boards. In one embodiment, the housing is expandable and comprises first and second matable sections. The number of slots and corresponding size of the sections varies depending on how many circuit boards are to be slidably received into the housing.

Each matable section of the housing has slots on its interior walls for slidably receiving edges of circuit boards in the rigid assembly. When fully inserted into the slots of the housing, a face plate having cut-outs for protruding connectors (attached to corresponding circuit boards in the assembly of circuit stacked circuit boards) fits over a front and rear opening in the first and second mated section of the housing. Thus, circuit boards in the housing are protected from all sides. Connectors protrude from the front face plate of the housing and enable the data acquisition node to interface to sensor devices for collecting data and provide command signals to control slave devices.

In another embodiment, the assembly of successively stacked circuit boards further includes a network interface circuit including a first communication port supporting upstream communication to a controller. A second communication port of the network interface circuit supports downstream communication with other data acquisition nodes. Accordingly, in this embodiment, a data acquisition node in the chain of data acquisition nodes receives communications from the controller over the first communication port and i) forwards the communications (e.g., data packets) through the second communication port to another downstream data acquisition node and/or ii) forwards the communications to a processing layer of the data acquisition node receiving the data packet. Thus, the data acquisition node selectively forwards a given data packet received at the first communication port to the processing layer (of the data acquisition node) if the given data packet has an address corresponding to the data acquisition node. Otherwise (or additionally), the network interface circuit forwards the given data packet downstream through the second communication port to another downstream data acquisition node. In this way, data packets may be transmitted up or down a daisy-chain of data acquisition nodes until the data packet reaches its destination. In the case of a broadcast message to all acquisition nodes, the data acquisition node duplicates a received message (e.g., one or more data packets) and forwards the message to other data acquisition nodes in a chain as well as forwards the message to the processing circuit in assembly of stacked circuit boards.

In one application, the data acquisition node learns its own address by intercepting a first received data packet and forwarding the first received data packet, regardless of its corresponding network address, to a processing layer (e.g., processor circuit board in the assembly of stacked circuit boards) of the data acquisition node. The processing layer then analyzes the first received data packet to identify its destination address. If the processing layer detects that the first received data packet is directed to itself (e.g., the given data acquisition node), then the processing layer further processes the first received data packet. If not, the processing layer forwards the first received data packet back to the network interface circuit that forwards the data packet on to other data acquisition nodes.

In addition to address information identifying to which of multiple data acquisition node a message is directed, a data packet optionally includes address information identifying to which of multiple circuit boards in a corresponding data acquisition node that the data packet is directed. Thus, the controller can generate data packets not only to specific data acquisition nodes in a network of nodes, but also specific circuit boards within one or multiple specified data acquisition nodes.

In another embodiment, the network interface of the data acquisition node includes a network interface controller. The network interface controller knows an address associated with the data acquisition node and utilizes address information in a received data packet to determine whether to forward the data packet through the second communication port to another data acquisition node or forward the data packet within the rigid assembly to a processing layer that, in turn, forwards information in the data packet to at least one circuit board in the rigid assembly.

In another embodiment, the assembly of circuit boards in the data acquisition node further includes a signal converter circuit and associated data transfer circuit. The signal converter circuit (e.g., Analog-to-Digital converter circuit) generates digital data based on an analog signal received from an external source such as a sensor device coupled to the data acquisition node. The data transfer circuit supports transfer of the digital data to a processor device (or a network interface circuit) in the assembly of circuit boards that generates data packets for transmission of the digital data to other data acquisition nodes or a central controller.

In one embodiment, to increase accuracy of converting the signal into digital data, opto-couplers isolate the signal converter circuit from the data transfer circuit during a conversion mode. Clocks associated with the data transfer circuit are disabled while the signal converter circuit converts the signal into the digital data. During non-conversion modes (e.g., when the signal converter circuit is not actively converting an input signal into digital data), the clocks of the data transfer circuit are activated to transfer the digital data to a processing device that generates data packets. The processing device generates data packets for transmission of the digital data from a corresponding data acquisition node over a network.

In another embodiment, the assembly of stacked circuit boards includes connector interfaces so that multiple signal paths are accessible to each of the multiple circuit boards. Each of the multiple signal paths support conveyance of signals (e.g., synchronization signals) amongst the multiple circuit boards. In one application, the rigid assembly includes a network interface for receiving communications over a network for synchronizing the data acquisition node with other data acquisition nodes in the network.

In yet another embodiment, a data acquisition node includes i) a first circuit board supporting communications over a network, and ii) a second circuit board coupled to an input and/or output device. A connector interface couples multiple conductors of the first circuit board to the second circuit board. Further, the first circuit board includes a corresponding first programmable interface coupled to the multiple conductors. The second circuit board includes a corresponding second programmable interface coupled to the multiple conductors. Configuration settings of the first programmable interface and the second programmable interface support conveyance of signals between the first circuit board and second circuit board.

In one embodiment of the invention, the input device is a sensor that monitors characteristics of a specific region in proximity to the data acquisition node. After collecting digital data associated with the input device, the second circuit board forwards the digital data acquired from the sensor device to the first circuit board for transmission of the digital data over the network. The second circuit board may include an isolation circuit between the sensor and the corresponding second programmable interface. The output device coupled to the second circuit board is activated based on commands received over the network from, for example, a central controller.

Similar to other embodiments of the invention, the first circuit board includes a first communication port supporting upstream communications and a second communication port to support downstream communications. The upstream communications include communications to a central controller and the downstream communications include communications to other data acquisition nodes in a data acquisition and control system.

In one embodiment, a portion of the multiple conductors supports synchronization between the first circuit board and the second circuit board. The first circuit board receives communications over the network indicating how to program the first programmable interface and the second programmable interface.

Based on communications over the network from a remotely located controller, the first circuit board and corresponding first programmable interface drives a signal to the second circuit board via at least one of the multiple conductors to synchronize the controller with functionality of the second circuit board. Conversely, based on events detected by the input device, the second circuit board and corresponding second programmable interface drives a signal to the first circuit board via at least one of the multiple conductors to synchronize functionality of the second circuit board with a remotely located controller over the network.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, emphasis instead being placed upon illustrating the embodiments, principles and concepts of the invention.

DETAILED DESCRIPTION OF THE INVENTION

An embodiment of the invention includes use of a controller that communicates with multiple data acquisition nodes over a network connection. The controller (such as a pluggable circuit card) plugs into a personal computer device that processes received data and generates commands over a network cable extending between the controller and a data acquisition node. Typically, the personal computer hosts an application for collecting and processing received data and generating control commands. The data acquisition node couples, via another network cable, to a second data acquisition node. The second data acquisition node optionally couples to yet other data acquisition nodes, and so on in a daisy-chain fashion. Each data acquisition node includes an interface to corresponding input/output devices associated with the data acquisition node. For example, the data acquisition node includes an interface to receive data from an input device such as a sensor (e.g., a sensor device that detect temperature, pressure, position, etc.). The data acquisition node processes the data retrieved from the sensor and forwards collected data to the controller via network messages. The controller generates control messages over the network to the data acquisition nodes and, more particularly, output or slave devices (e.g., motors, solenoids, relays, etc.) associated with the data acquisition nodes. Use of distributed data acquisition nodes configured in this manner speeds up data collection, provides more accurate data collection, simplifies the data collection process, reduces maintenance, increases reliability, etc.

Figure 1:
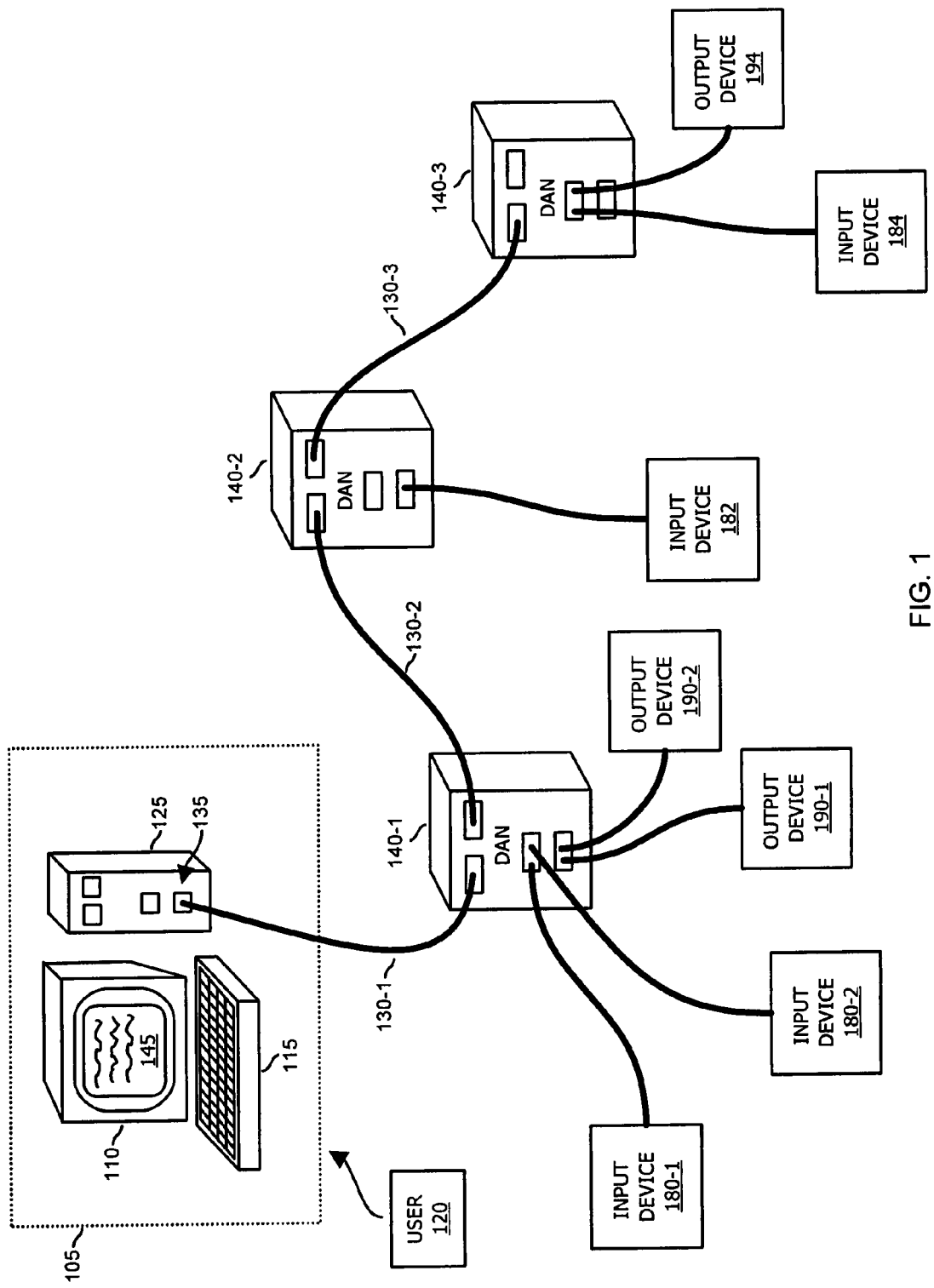
FIG. 1 is a diagram of a data acquisition and control system according to an embodiment of the invention.

FIG. 1 is a diagram of a data acquisition and control system 100 according to an embodiment of the invention. As shown, data acquisition and control system 100 includes computer system 105 coupled to data acquisition nodes 140 (i.e., data acquisition node 140-1, data acquisition node 140-2, data acquisition node 140-3) via links 130 (i.e., link 130-1, link 130-2, and link 130-3). Computer system 105 includes monitor 110, keyboard 115, and host system 125 (e.g., a personal computer and a controller card). Host system 105 includes controller 135 that couples to data acquisition node 140-1 via link 130-1. Data acquisition node 140-1 couples to data acquisition node 140-2 via link 130-2. Data acquisition node 140-2 couples to data acquisition node 140-3 via link 130-3. Data acquisition node 140-1 interfaces with input device 180-1 and input device 180-2 (collectively, input devices 180) as well as output device 190-1 and output device 190-2 (collectively, output devices 190). Data acquisition node 140-2 interfaces with input device 182. Data acquisition node 140-3 interfaces with input device 184 and output device 194. The topology of data acquisition and control system 100 varies depending on the application.

Monitor 110 displays graphical user interface 145 and enables user 120 to configure data acquisition nodes 140 for acquisition of data from input devices 180, 182, and 184 (e.g., temperature sensors, pressure sensors, photo sensors, etc.) as well as control output devices 190, 192, 194 (e.g., motors, solenoids, relays, etc.) at remote locations with respect to computer system 105. Graphical user interface 145 also presents acquired data (e.g., via graphs, charts, raw data, etc.) on monitor 110 for user 120.

In one embodiment, data acquisition and control system 100 (e.g., a distributed, networked automation and control system) utilizes links 130 such as conventional Ethernet cables to support real-time or near real-time communications via network messages such as network data packets. Instead of using a standard Ethernet protocol, data acquisition and control systemdata acquisition and control system 100 utilizes a DaqBIOS protocol (e.g., a communication protocol supporting transmission of commands and data over links 130 in a deterministic fashion). The DaqBIOS protocol (as discussed herein and in related applications) may support communication with more than a thousand mixed analog and digital I/O points with guaranteed responsiveness (communications from a data acquisition node 140 to host system 125) to be less than 1 millisecond. Thus, controller 135 may transmit commands to control output devices in less than 1 millisecond as well as receive data from input devices in less than 1 millisecond.

Data acquisition and control system 100 supports flexible expansion and contraction because of its modular nature. For example, design afterthoughts may require that data acquisition and control system 100 include one or more additional data acquisition nodes 140 for interfacing with more input and output devices. Addition of a data acquisition node 140 involves inserting the data acquisition node 140 along a daisy-chain of links 130. In addition to adjusting a number of data acquisition nodes 140 deployed in data acquisition and control system 100, functionality of each data acquisition node 140 may be adjusted or varied depending on the application. For example, a data acquisition node 140 may be enlarged or reduced in size to support interfacing with a greater or fewer number of input devices 180 and/or output devices 190. This modular system flexibility coupled with deterministic transmission of network messages provides a powerful solution for controlling remote devices (i.e., input devices and output devices) as wells as acquiring data from remote devices.

Figure 2:
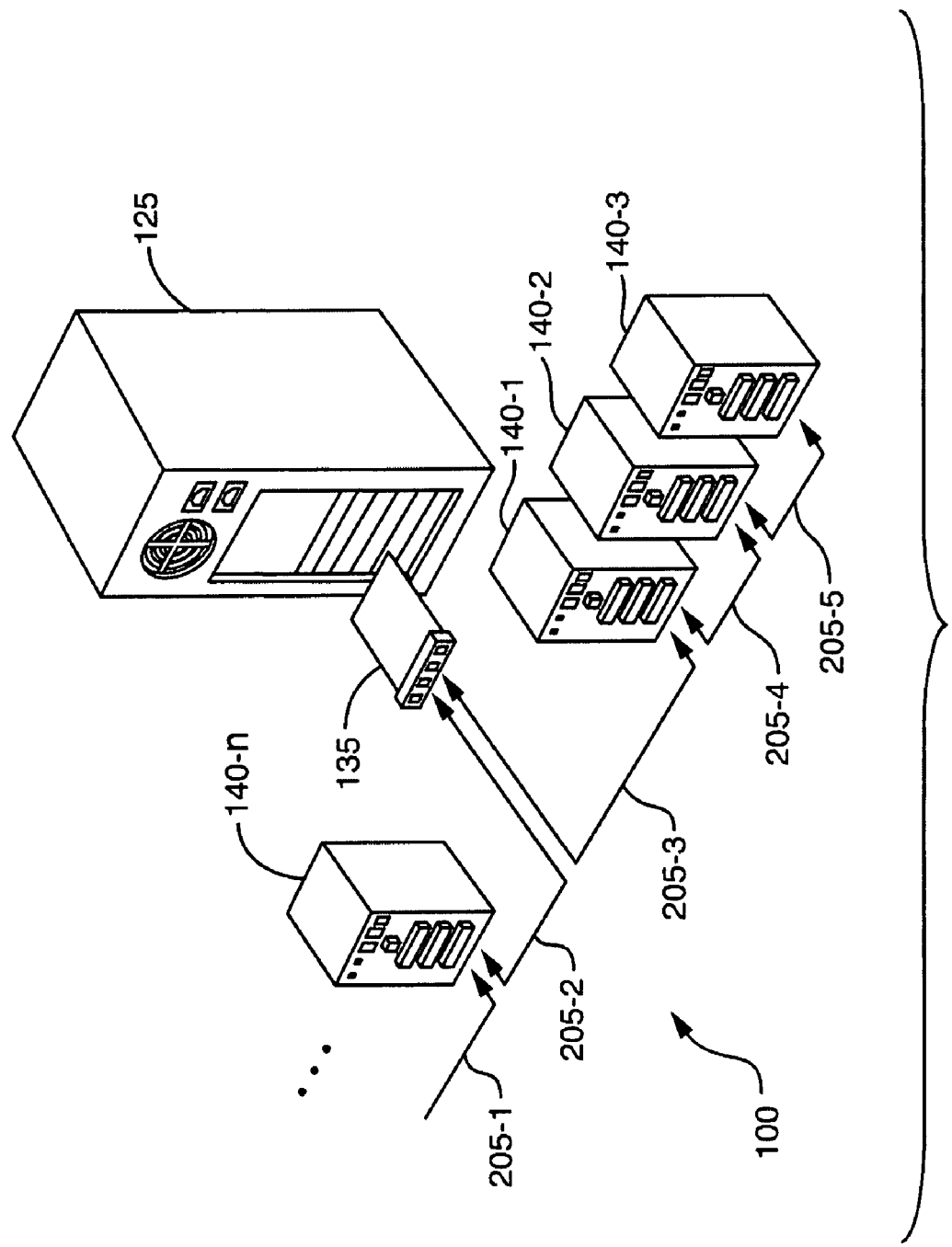
FIG. 2 is a diagram of a data acquisition and control system according to an embodiment of the invention.

FIG. 2 is a diagram illustrating bi-directional flows 205 of network messages in data acquisition and control system 100 according to an embodiment of the invention. Data acquisition and control system 100 includes data acquisition nodes 140, controller 135 and host system 125. As shown, data acquisition and control system 100 includes one or multiple daisy-chains of data acquisition nodes 140. For example, one daisy-chain as shown includes data acquisition nodes 140-1, 140-2, and 140-3. In one embodiment, data acquisition node 140-3 is a termination node at the end of a daisy-chain. Generally, network messages generated by controller 135 hop from data acquisition node 140-1 to data acquisition node 140-2 to data acquisition node 140-3 until reaching a destination address. The data acquisition node 140 to which a message is directed processes the received message.

Data acquisition and control system 100 includes controller 135 (e.g., a controller card) that fits into host system 125 such as a Personal Computer or PXI/CompactPCI system. Host system 125 operates controller 135 via a connection such as a PCI bus. As discussed, controller 135 couples to data acquisition nodes 140 via links 135 such as copper or fiber optic cable.

Each data acquisition node 140 consists of a housing that contains multiple stacked circuit boards. Layers of the stacked circuit boards include a communications layer, a processor layer with an embedded real-time kernel, and one or multiple input/output device interface layers. User 120 selects a desired functionality from a range of input/output layers. In one embodiment, input/output layers are factory installed, configured and calibrated. Thus, multiple circuit boards in data acquisition nodes 140 support functions such as processing of received network messages, generation of network messages to controller 135, interfacing with input device and output devices, etc.

In one embodiment, users 120 program their applications in C using a straightforward API that provides access to hardware functionality. Alternatively, users 120 may write their applications in LabVIEW using supplied low-level VIs.

After compiling an application on the host system 125, a user 120 may download the application to a data acquisition node 140 in several ways. For example, in one embodiment, user 120 downloads an application from host system 125 over links 130 to a data acquisition node 140. In another embodiment, a user 120 downloads an application over a serial link or over a USB port of a corresponding data acquisition node 140. The application may be configured to run under host control or as a standalone task in the data acquisition node 140.

In one embodiment, controller 135 runs without assistance of host system 125 because controller 135 is an onboard processor device such as a PowerPC processor running its own operating system such as a firmware version of QNX (Ver 6.2 Runtime), Linux or VxWorks. The processor device runs executive programs that coordinate and control the activities of multiple data acquisition nodes 140.

Each data acquisition node 140 optionally executes its own local program (operating system and/or corresponding application programs. Thus, a data acquisition node 140 can function as a standalone processing system in communication with other data acquisition nodes 140 as well as controller 135. Alternatively, each data acquisition node 140 operates as an integrated part of a distributed-network architecture.

Data acquisition nodes 140 supports continuous communications with the controller 135. To support such functionality, data acquisition node 140 optionally includes a ColdFire processor and has its own firmware operating system such as μClinux, VxWorks, etc.

Hardware features of data acquisition nodes 140 in data acquisition and control system 100 can be configured and setup through use of a serial command language. For example, user 120 configures parameters such as the IP (Internet Protocol) address or sampling rate associated with a data acquisition node 140 based on simple text commands from any terminal application over links 130 or over a dedicated serial input port of a given data acquisition node 140.

Software run on host system 125 supports an explorer application that searches for circuit cards (e.g., controller 135) plugged into its backplane. Additionally, host system 125 searches for any data acquisition nodes 140 attached to a network. Each data acquisition node 140 returns its associated network address information back to the host system 125 including any I/O resources of a data acquisition node 140. User 120 (e.g., a programmer) may need this information during program development to specify individual I/O devices they wish to access or control for a particular application.

Figure 3:
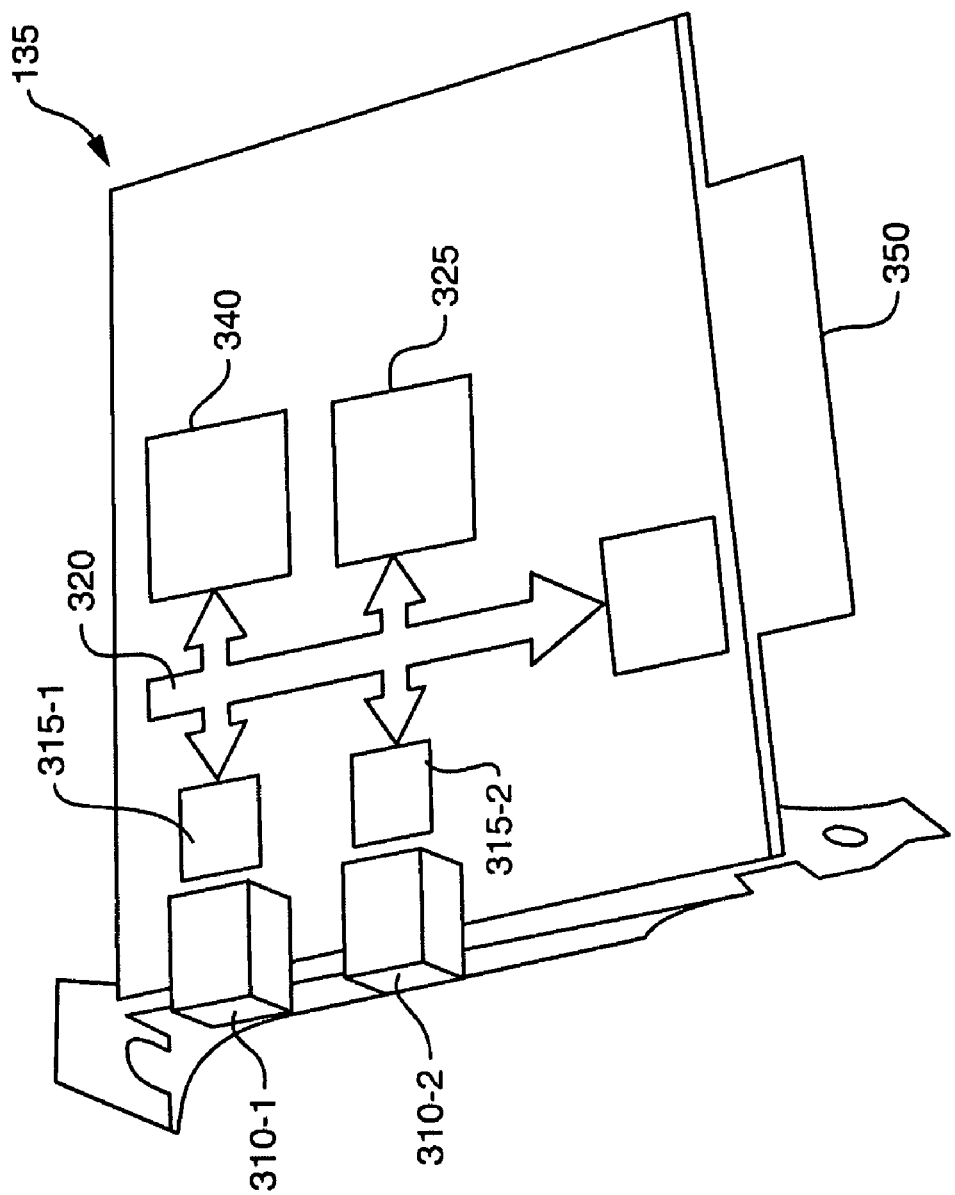
FIG. 3 is a pictorial diagram of a controller according to an embodiment of the invention.

FIG. 3 is a pictorial diagram of controller 135 according to an embodiment of the invention. As shown, controller 135 includes communication port 310-1 and communication port 310-2 (collectively communication ports 310), network interface 315-1 and network interface 315-2 (collectively network interface 315), data bus 320, processor 325, memory 340 (e.g., RAM, ROM, Flash memory, IDE, etc.), bridge 350, and circuit card interface 350.

Generally, controller 135 includes communication ports 310 and corresponding network interface 315 to transmit and receive data messages to/from data acquisition nodes 140. Processor 325 couples to network interface 315, bridge 345 and memory 340 via bus 320. Based on use of bus 320, processor 325 i) generates network messages including commands to data acquisition nodes, ii) receives data from data acquisition nodes 140, iii) communicates with host system 125, iv) accesses memory 340, etc.

In one application, controller 135 supports PCI and PXI/CompactPCI formats and supplies two 100-BaseT Ethernet communication ports to either standard copper cabling or fiberoptic cable. Use of fiber optic cables reduces noise interferences with communications in applications where EMI/RFI is present.

Each communication port 310 communicates with multiple data acquisition nodes 140 in a daisy-chained configuration. Processor 325 may operate independent of host system 125, leaving the host system 125 free to support other tasks. For example, in one embodiment, controller 135 optionally includes its own onboard operating system such as a runtime version of QNX, VxWorks or Realtime Linux.

Controller 135 serves multiple purposes. First, after creating an application program, controller 135 enables a user 120 to download the program from the host system 125 to a corresponding data acquisition node 140. Second, controller 135 controls the operation of data acquisition nodes 140 over links 130. Control of data acquisition nodes 140 includes either using the DaqBIOS protocol to transmit and receive network messages or using a standard Ethernet protocols compatible with enterprise-wide systems to transmit and receive messages.

User 120 can create a graphical front end for a sophisticated application that involves use of multiple I/O points from multiple data acquisition nodes 140. To make application development easier for the user 120, data transfers over the network (e.g., links 130) are optionally handled without any involvement of user software. Host system 125 includes a hardware mapping to I/O devices associated with data acquisition nodes 140. Consequently, users 120 may develop programs based on use of input/output devices coupled to corresponding data acquisition nodes 140 (as in FIG. 1).

Conventional Ethernet applications resolve possible conflicts among multiple devices attempting to transmit based on Carrier Sense Multiple Access with Collision Detection (CSMA/CD). In contrast, the DaqBIOS protocol achieves more deterministic behavior through a slotted type communication protocol.

Use of the DaqBIOS protocol guarantees hard real-time responses and supports multiple modes. In a first mode, each data acquisition node 140 receives the same amount of service time in a scan. Each data acquisition node 140 is assigned a time slot. Controller 135 uses the assigned time slot to service a data acquisition node 140. For example, controller 135 uses timeslot 1 to service (e.g., send commands and receive data) data acquisition node 140-1, timeslot 2 to service data acquisition node 140-2, and so on. The total number of time slots in a frame of time slots depends on an overall required response time. In one application, every slot takes approximately 60 μsec to be processed, so a data acquisition and control system 100 can serve as many as 16 data acquisition nodes within one frame yet achieve a 1-msec response time.

In a second DaqBIOS mode, controller 135 selectively varies the amount of bandwidth allocated to each data acquisition node 140 for returning data during a scan. The second mode provides greater flexibility in applications in which bandwidth meets the needs of systems where some nodes must transmit more information than others. During operation in the second mode, controller 135 broadcasts a network message to all data acquisition nodes 140 at the beginning of each frame to indicate i) when each data acquisition node 140 is permitted to transmit and ii) a limitation on the size of response packet. The controller 135 then receives an individual reply from each data acquisition node 140 based on the predefined timing pattern. The variable timing protocol can be used on dedicated LANs (Local Area Networks).

Figure 4:
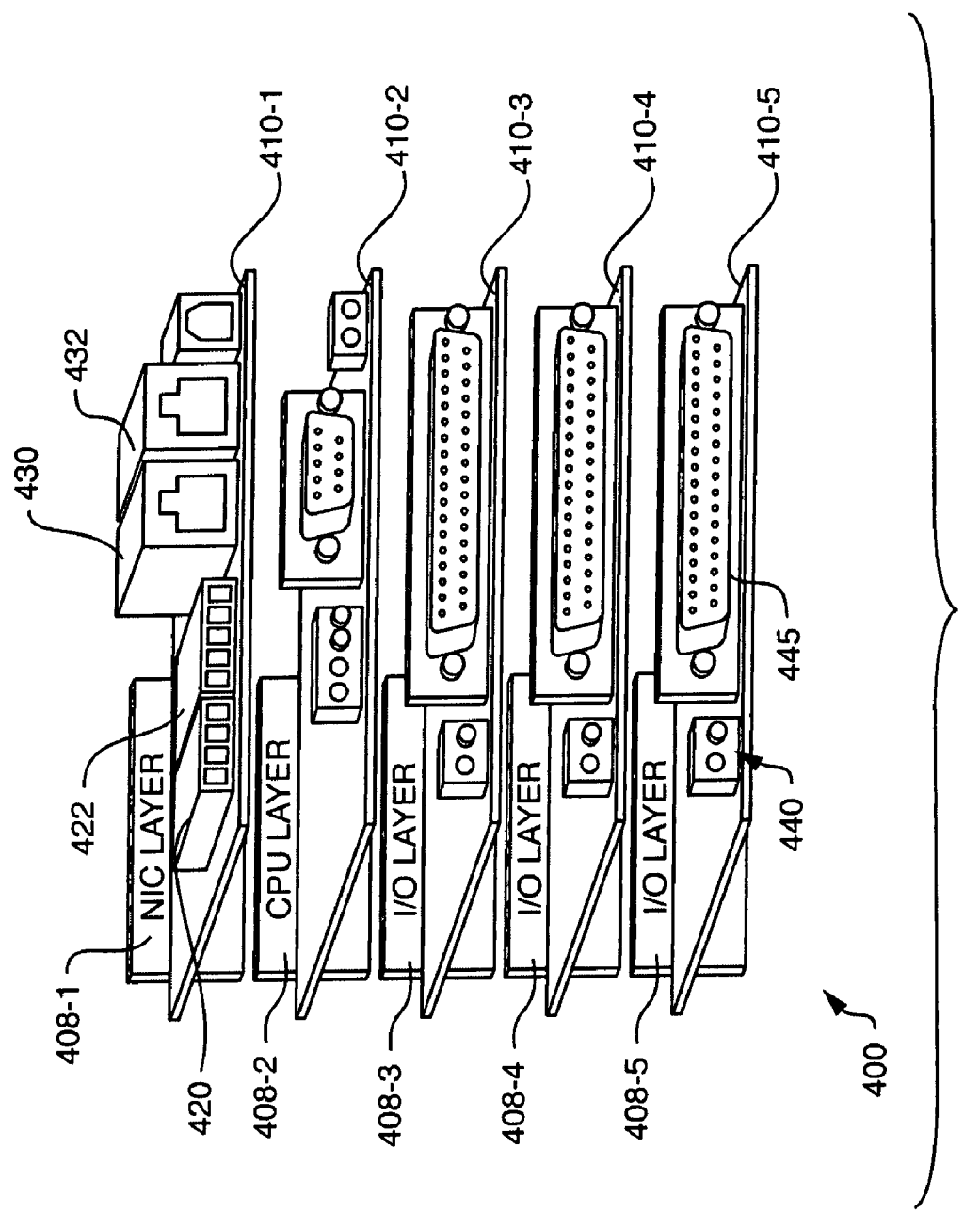
FIG. 4 is a diagram of multiple stacked circuit boards according to an embodiment of the invention.

FIG. 4 is a diagram of an assembly of stacked circuit boards 400 according to an embodiment of the invention. As shown, assembly of stacked circuit boards 400 includes circuit board 410-1 (e.g., a network interface circuit board), circuit board 410-2 (e.g., a processor circuit board), circuit board 410-3 (e.g., an input/output circuit board), circuit board 410-4 (e.g., an input/output circuit board), and circuit board 410-5 (e.g., an input/output circuit board). Connectors 408 (i.e., connector 408-1, connector 408-2, connector 408-3, connector 408-4, and connector 408-5) provide connectivity between respective circuit boards 410. Circuit board 410-1 includes a power input connector 420, power output connector 422, communication port 430 and communication port 432.

In one embodiment, a data acquisition node 140 and corresponding assembly of circuit boards 400 has dimensions of 4×4×4 inches (e.g., length=4 inches, width=4 inches, height=4 inches) assembly of circuit boards 400 includes additional circuit boards so that data acquisition node 140 measures 4×4×6 inches. These measurements may each vary by several inches or more in any direction. Cube-like and rectangular type embodiments of assembly of stacked circuit board 400 enable housing of data acquisition node 140 also to be cube-like and rectangular like as will be discussed later in this specification.

Each assembly of stacked circuit boards 400 consists of two primary subsections: a core module and an I/O section for interfacing with input/output devices. Core modules include circuit board 410-1 and circuit board 410-2 such as a network interface and a processor layer. The I/O section of the assembly of stacked circuit boards 400 includes one or multiple I/O layers such as circuit boards 410-3, 410-4, and 410-5.

Connectors 408 include multiple conductors (e.g., female portion of connector 408 is on topside while male portion of connector is on bottom side as shown in FIG. 4) accessible to each of the circuit boards 410. In one embodiments, conductors include a bus utilized by processor circuit board 410-2 to control aspects of I/O circuit boards 410-3, 410-4, and 410-5 as well as network interface circuit board 410-1. A certain portion of conductors in connectors 408 are reserved for synchronization purposes as will be discussed in connection with FIG. 11. The core module, which is made up of a processor layer and a network layer, handles the corresponding data acquisition node 140 supervisory operations including interfacing with the controller 135 and other data acquisition nodes 140.

Power received on power input connector 420 provides power for assembly of stacked circuit boards 400 as well as power supplied by circuit board 410-1 through power output connector 422 to other data acquisition nodes 140. In certain embodiments, circuit board 410-1 includes power converter circuitry to convert received power to different voltage and current levels.

The I/O Layers may be populated with factory-installed data acquisition module circuitry (e.g., specialized data acquisition microprocessors and associated circuitry) that performs sophisticated analog and digital I/O data probing and collection.

Each I/O layer (e.g., circuit board 410-4) may include i) an interface for the acquisition of data, such as data from laboratory instrumentation or equipment, ii) module processing circuitry to collect the data, and iii) an inter-cube interface to couple that I/O layer either to the Core Module or to another I/O Layer. As an example I/O layer, circuit board 410-5 includes status indicator 440 (e.g., an LED status light) and a connector 445 that includes conductors for carrying signals to and from input/output devices.

Figure 5:
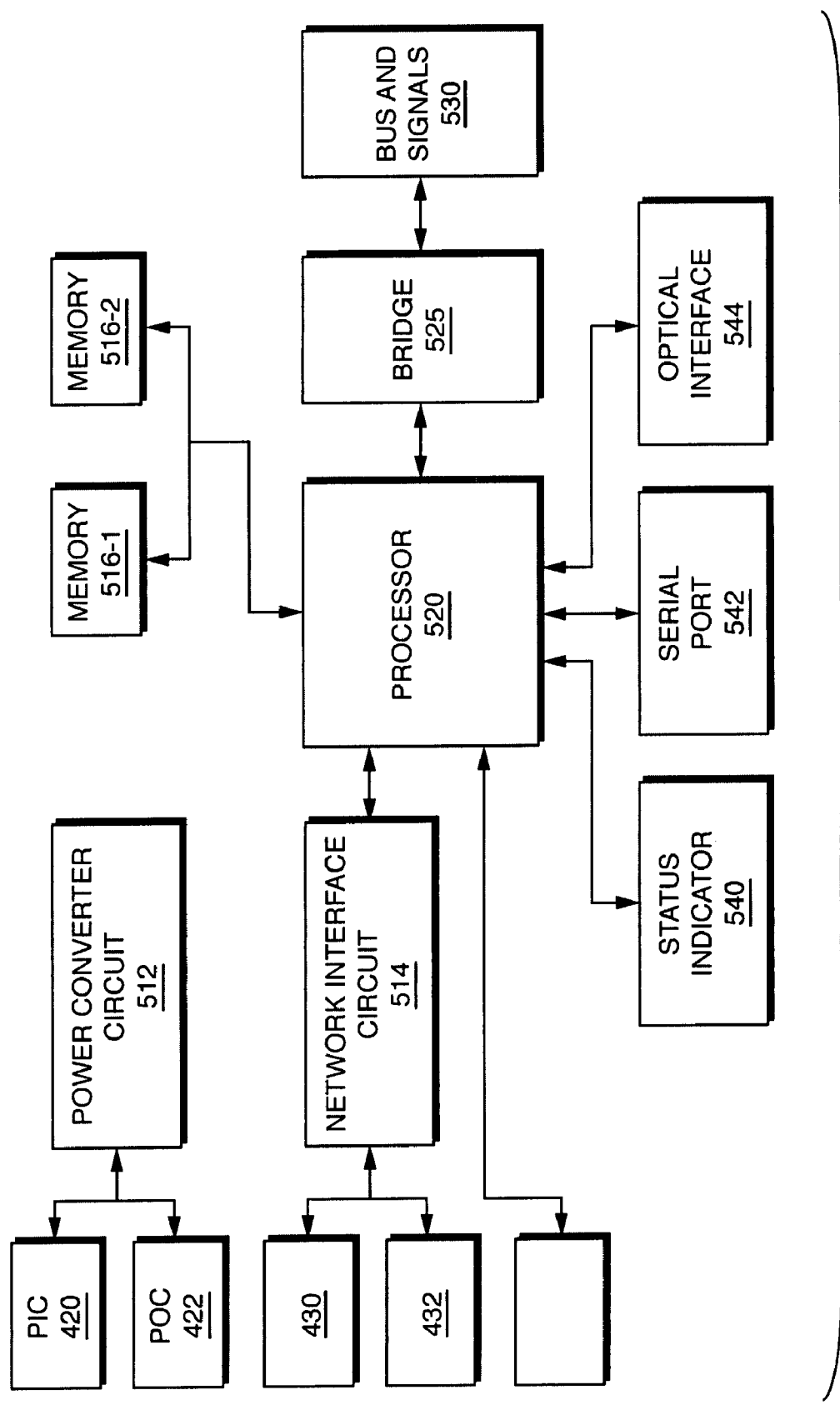
FIG. 5 is a diagram illustrating functional aspects of multiple circuit layers according to an embodiment of the invention.

Layering associated with assembly of stacked circuit boards 400 provides flexibility. For example, when configuring a data acquisition node 140 according to one embodiment, users 120 can choose from a selection of I/O Layers:

Analog Inputs
  general-purpose analog input (24 channels, 16-bit resolution, gains from 1 to 1000, sampling rate to 160 kHz)
  direct temperature-sensor inputs (25 channels, 24-bit resolution, sampling to 500 Hz, built-in CJC)
Analog Outputs
  analog output (8 channels, either 12- or 16-bit resolution, 0 to 10V, 0 to −10V or 110V ranges, 5 mA/channel drive)
  For these analog-output layers, users can also choose from several internal upgrade options for current outputs (0-20 mA or 4-20 mA), higher output current (100 mA/ch), or higher voltage outputs (±40V at 10 mA max output). Certain options may involve use of external auxiliary power supplies.
Digital I/O
16 bit-programmable points
24 inputs
24 outputs
48 mixed I/O configurable in groups of 8
Multiple Serial Ports
eight RS-232 ports
eight RS-485 ports Power Conversion
generate ±15V at 40W
generate +24V at 40W
Other options include support for:
wireless communications
CAN-bus interface
motion-control
mass storage/CompactFlash interface
battery power FIG. 5 is a diagram illustrating functionality associated with multiple circuit layers according to an embodiment of the invention. As shown, core module 500 (e.g., functionality provided by circuit board 410-1 and 410-2 in FIG. 4) includes power input connector 420, power output connector 422, communication port 430 (e.g., via RJ-45 connector), communication port 432 (e.g., via RJ-45 connector), serial port 510 (e.g., USB port), serial port 542 (e.g., RS-232 port), status indicator 540 (e.g., LEDs), optical interface 544 (e.g., IrDA), network interface circuit 514, power converter circuit 512, processor 520 (e.g., Motorola ColdFire CPU), bridge 525, memory 516 (e.g., memory 516-1 such as 6 MB of Flash and memory 516-2 such as 16 MB SDRAM), and bus 530. Note that functionality as shown is optionally partitioned to reside on any number of circuit boards.

Processor functionality (e.g., circuit board 410-2 as shown in FIG. 4) of core module 500 includes processor 520 such as a 66-MHz ColdFire CPU running either μC/OS or μClinux plus corresponding memory 516 such as 16 Mbytes of SDRAM (expandable to 64 M bytes) and 6 M bytes of Flash memory (2 M bytes for system files, 4 M bytes for the user). The processor functionality also includes an optical interface 544 such as an IrDA interface so that users can field-configure a data acquisition node 140 with the assistance of an infrared-equipped PDA running Microsoft's Pocket PC operating system.

Network interface functionality (e.g., network interface circuit 514 such as on circuit board 410-1 in FIG. 4) in the core module 500 includes multiple corresponding communication ports 430, 432 such as two RJ-45 jacks for daisy-chaining a communication link to other data acquisition nodes 140. The network interface functionality also provides a serial port 510 such as a USB (Universal Serial Bus) over which users 120 can configure hardware as well as download new programs or upload processed data.

The network interface functionality includes power input connector 420, power output connector 422, and power converter 512 to receive, process and daisy-chain power from one data acquisition node 140 to another. For example, circuit board 410-1 of the assembly of stacked circuit boards 400 includes an input power connector 420 for receiving an input power signal and an output power connector 422 for daisy-chaining power to other downstream data acquisition nodes 140. Thus, in the context of a data acquisition and control system 100 including multiple daisy-chained data acquisition nodes 140, a first data acquisition node 140-1 in a chain of multiple daisy-chained nodes 140 receives power on the input power connector 420, converts the power via power converter circuit 512, and forwards power out the power output connector 422 to other data acquisition nodes 140 in a chain. Some of the converted power generated by power converter circuit 512 may be used to provide power to assembly of circuit boards 400 as well as corresponding input/output devices coupled to a data acquisition node 140.

As discussed, the assembly of stacked circuit boards 400 includes a network interface circuit 514 (i.e., network interface functionality) and corresponding communication port 430 supporting upstream communication to the controller 135. Communication port 432 of the network interface circuit 514 supports downstream communications with other data acquisition nodes 140. Accordingly, in this embodiment, a data acquisition node 140-1 receives communications from the controller 135 over the communication port 430 and either i) forwards the communications (e.g., data packets) through communication port 432 to downstream data acquisition node 140-2 or ii) forwards the communications to a processing layer such as processor 520 of the data acquisition node 140 receiving the data packet. Thus, the data acquisition node 140 selectively forwards a given data packet received at communication port 430 to the processing layer (of the data acquisition node) if the given data packet has an address corresponding to the data acquisition node. Otherwise (or additionally if the message is a broadcast type message), the network interface circuit 514 forwards the given data packet downstream through communication port 432 to another downstream data acquisition node 140. In this way, data packets may be transmitted up or down a daisy-chain of data acquisition nodes 140 until the data packet reaches its destination. In the case of a broadcast message to all acquisition nodes 140, the data acquisition node duplicates a received message (e.g., one or more data packets) and forwards the message to other data acquisition nodes 140 in a chain as well as forwards the message to the processor 520 in the assembly of stacked circuit boards 400.

In one application, a data acquisition node 140 learns its own network address by intercepting a first received data packet and forwarding the first received data packet, regardless of its corresponding network address, to a processing layer (e.g., processor circuit board 410-1 in the assembly of stacked circuit boards 400) of the data acquisition node 140. The processor 520 in the processing layer analyzes the first received data packet to identify its destination address. If the processor 520 detects that the first received data packet is directed to itself (e.g., the given data acquisition node), then the processor 520 further processes the first received data packet. If not, the processor 520 forwards the first received data packet back to the network interface circuit 514 that forwards the data packet on to other data acquisition nodes 140 through communication port 432 (or in an upstream direction, to controller 135). This technique avoids needlessly sending all data packets to the processor 520 for a determination of whether the data packets are associated with a corresponding data acquisition node 140. Instead, after the network interface circuit determines an address associated with the data acquisition node 140 and the data acquisition node 140 determines whether to forward the data packet to another node and/or processor 520.

In addition to address information identifying to which of multiple data acquisition nodes 140 a message is directed, a data packet optionally includes address information identifying to which of multiple circuit boards 410 in a corresponding data acquisition node 140 that the data packet is directed. For example, the controller 135 can generate data packets not only to specific data acquisition nodes 140 in a network of nodes, but also specific circuit boards 410 within a data acquisition node 410.

In one embodiment, the network interface circuit 514 includes a network interface controller. The network interface controller knows an address associated with the data acquisition node and utilizes address information in a received data packet to determine whether to forward the data packet through the communication port 432 to another data acquisition node 140 or forward the data packet within the assembly of circuit boards 400 to a processor 520 that, in turn, forwards information in the data packet (or the data packet itself) to at least one circuit board 410 in the assembly of stacked circuit boards 400.

Figure 6:
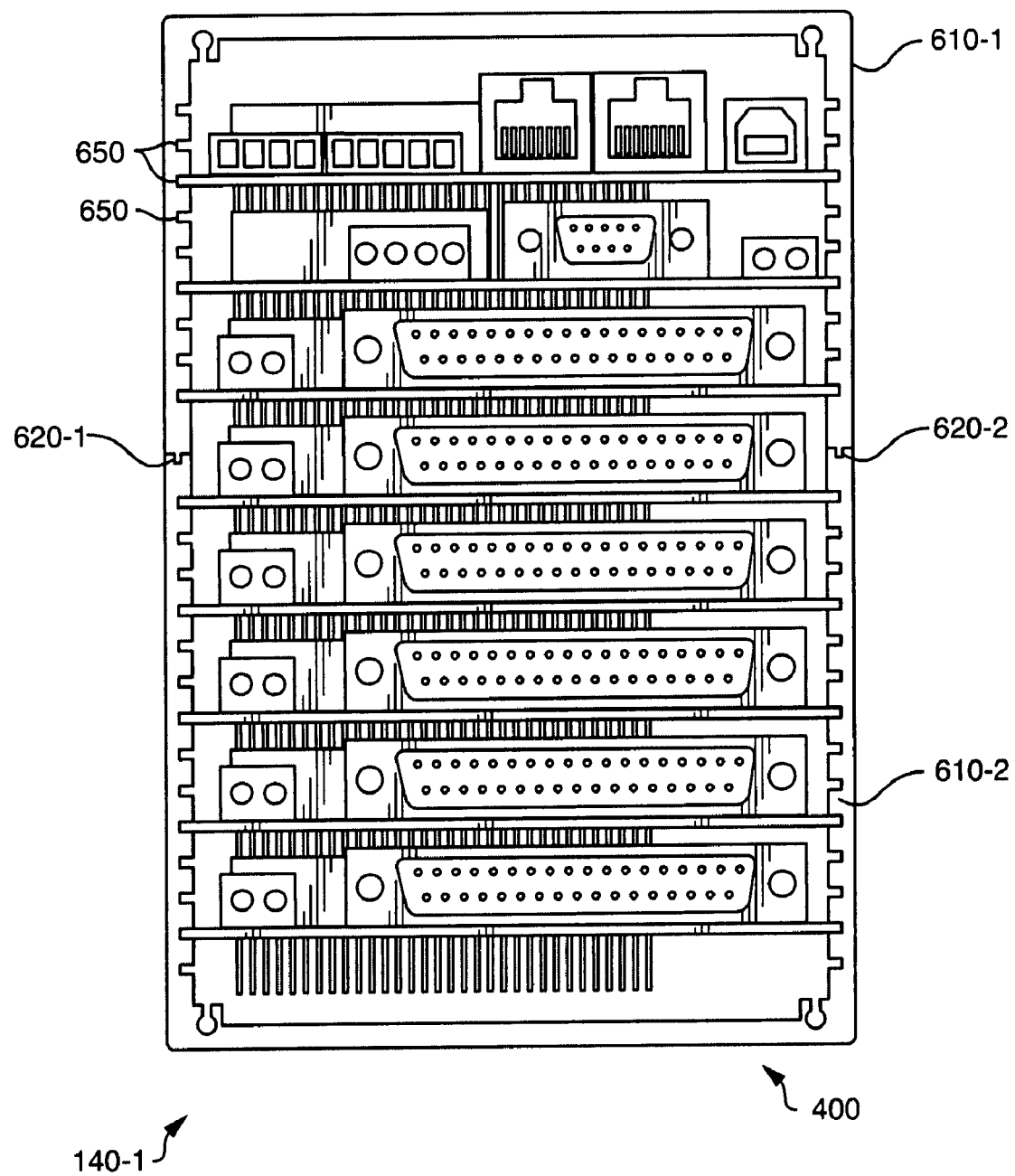
FIG. 6 is a front view diagram of a data acquisition node without a faceplate according to an embodiment of the invention.

FIG. 6 is a front view diagram of a data acquisition node 140 without a faceplate (e.g., a plate covering internal electronic circuitry) according to an embodiment of the invention. As shown, data acquisition node 140 includes matable section 610-1 and matable section 610-2 to form housing 610 encompassing slidably received assembly of stacked circuit boards 400. Channels 620-1 and 620-2 (e.g., a tongue and groove design) in matable sections 620-1 and 620-2 provide support along wall of housing 610.

As previously discussed in FIG. 4, the data acquisition node 140 includes multiple circuit boards 410 that, when interconnected, form an assembly (e.g., a rigid assembly) of successively stacked circuit boards 400. For example, circuit board 410-1 directly and electrically couples to corresponding adjacent circuit board 410-2 in the assembly via connectors 408-1 and connector 408-2.

The assembly of stacked circuit boards 400 includes a power converter circuit 512 operable to provide power to at least one other circuit board in the assembly of stacked circuit boards 410. For example, the power converter circuit 512 receives a power input signal, conditions the power input signal, and distributes power to one or more other circuit boards in the assembly of stacked circuit boards 400.

Figure 8:
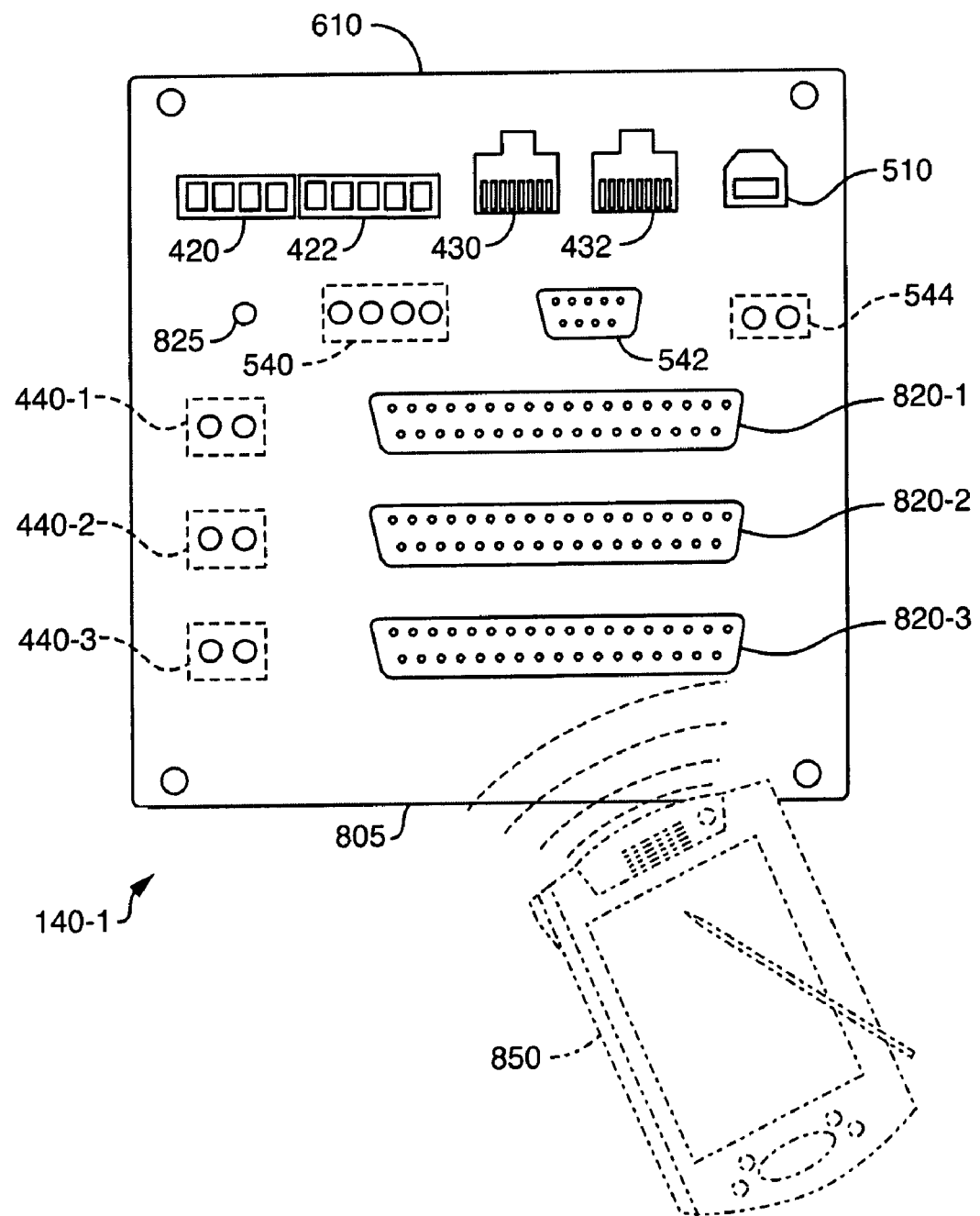
FIG. 8 is a front view diagram of a data acquisition node (including a faceplate) and wireless processing device according to an embodiment of the invention.

Referring again to FIG. 6, the data acquisition node 140-1 includes a housing 610 that slidably receives the assembly of stacked circuit boards 400. In the example embodiment as shown, the housing 610 is expandable and comprises first and second matable sections 610-1 and 610-2 respectively. Each matable section 610-1, 610-2 of the housing 610 has slots 650 on its interior walls for slidably receiving edges of circuit boards 410 in the assembly of stacked circuit boards 400. The number of slots 650 on inner wall of housing 610 and may vary as well as a corresponding size of the matable sections 610-1, 610-2 may vary depending on how many circuit boards 410 are to be slidably received into the housing 610. When the stack of circuit boards 410 is fully inserted into the slots 650 of the housing 610, a faceplate (as shown in FIG. 8) having cut-outs for protruding connectors (attached to corresponding circuit boards in the assembly of circuit stacked circuit boards) fits over a front and rear opening in the first and second mated section of the housing 610. This is more particularly shown in FIG. 8. Thus, circuit boards 410 in the housing 610 are protected from all sides. Connectors protrude from the front face plate of the housing and enable the data acquisition node 140 to interface to sensor devices (i.e., input devices) for collecting data and provide command signals to control slave devices (i.e., output devices).

The data acquisition node 140-1 according to an embodiment of the invention provides benefits over those used in conventional data acquisition systems. For example, according to certain principles of the invention, there is no need for inclusion of a separate and distinct backplane in the housing 610 for providing connectivity among the assembly of circuit boards 400 because the connectors 408 on the multiple circuit boards 410 provide interconnectivity amongst each other. Further, stacking of circuit boards 410 (as opposed to use of a single, large circuit board to provide functionality of data acquisition node 140) enhances a form factor associated with the housing 610. For example, stacking circuit boards 410 enables the housing 610 to be formed into a substantially cube-like or rectangular-like shape. Additional slots 650 in the inside of the housing 610 act like heat dissipation fins to dissipate thermal energy. Such a form factor of housing 610 is advantageous in the field because a cube-like housing can include a high density of external connectors on any of its faces compared to conventional pancake-shaped housings that house only a single large circuit board.

Figure 7:
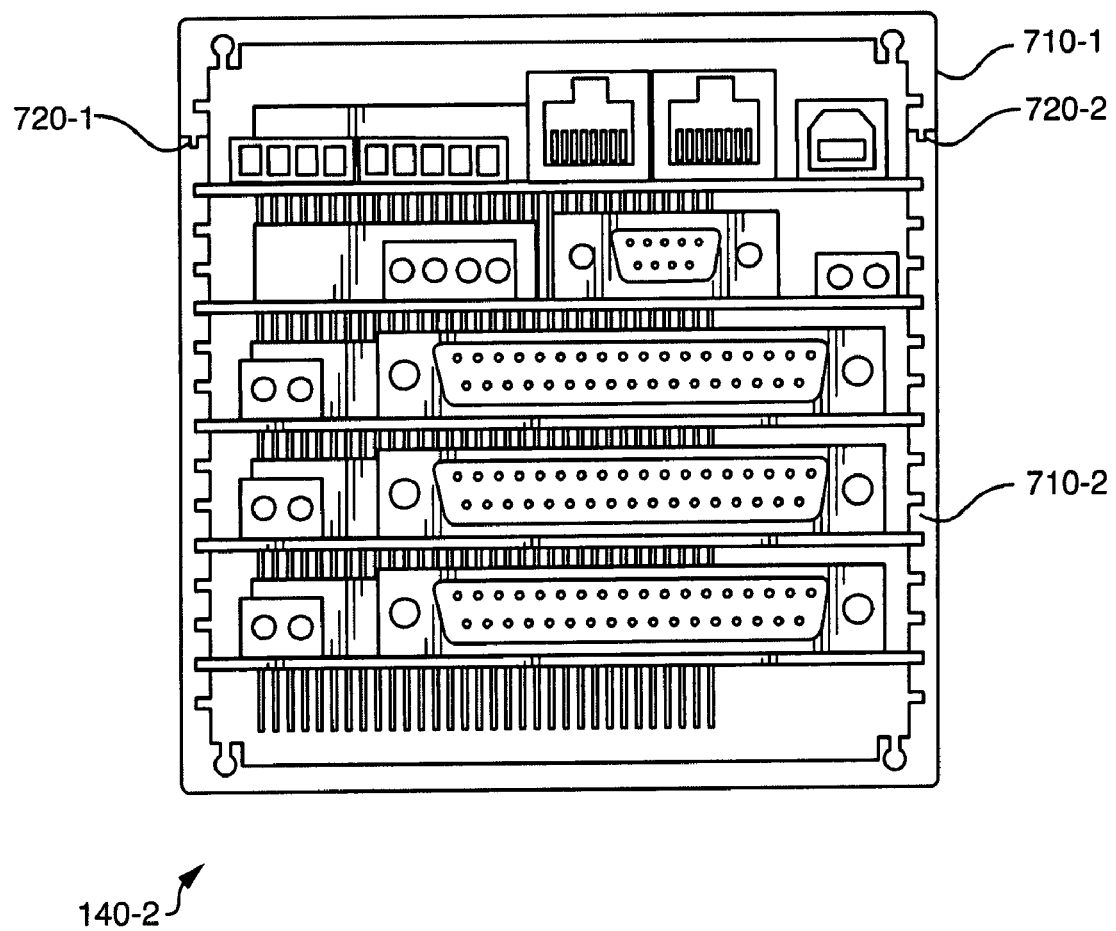
FIG. 7 is a front view diagram of a data acquisition node without a faceplate according to an embodiment of the invention.

FIG. 7 is a front view diagram of a data acquisition node 140-2 without a faceplate according to an embodiment of the invention. Data acquisition node 140-2 illustrates that the housing 710 can be upsized or downsized (as compared to data acquisition node 140-1 in FIG. 6) to encompass different numbers of circuit boards 410 in an assembly of circuit boards 400 depending on the application.

FIG. 8 is a front view diagram of a data acquisition node (including a faceplate 805) and wireless processing device 850 according to an embodiment of the invention. Faceplate 805 includes cutouts for power input connector 420, power output connector 422, communication port 430, communication port 432, serial port 510, reset button 825, status indicators 540, serial interface 542, optical interface 544, status indicators 440-1, 440-2, 440-3, connectors 820-1, 820-2, 820-3. Faceplate 805 attaches to housing 610 via screws, adhesives, etc.

In general, power input connector 420 receives an input power signal (from a battery, power supply, etc.) for powering data acquisition node 140-1. Received power is optionally daisy-chained through power output connector 422 to other data acquisition nodes 140 as previously discussed in connection with other figures.

Communication port 430 of data acquisition node 140-1 receives upstream network messages from controller 135 and appropriately forwards the network messages through communication port 432 to downstream data acquisition nodes 140. In a reverse direction, communication port 432 of data acquisition node 140-1 receives network messages from downstream data acquisition nodes 140 and forwards appropriate network messages through communication port 430 to controller 135.

Serial port 510 of data acquisition node 140-1 supports serial communications to external devices to data acquisition node 140-1.

Reset button 825 enables user 120 to reset data acquisition node 140-1 in case the assembly of stacked circuit boards 400 malfunctions or needs to be initialized during operation.

Status indicators 540 (e.g., LEDs) provide an indication to user 120 regarding a status of data acquisition node 140-1 and, more particularly, a processing layer of data acquisition node 140-1.

Serial interface 542 such as an RS-232 interface enables user 120 to retrieve and download information to and from data acquisition node 140-1.

Status indicators 440-1, 440-2, 440-3 display status information associated with corresponding I/O circuit boards in data acquisition node 140-1. Connectors 820-1, 820-2, 820-3 of data acquisition node 140-1 include electronic signals that are used for conveying control commands to output devices and retrieve data or raw signals from input devices.

Optical interface 544 (e.g., IrDA) allows user 120 of handheld personal device 850 to communicate with data acquisition node 140-1 (e.g., via an infrared signal) without the assistance of the controller 135. In one application, use of handheld personal device 850 enables the user 120 to change operational parameters of a data acquisition node 140-1. Additionally, use of handheld personal device 850 enables the user 120 to retrieve acquired data and/or set values of any output channels. In one application, a supporting applet is written to work with any infrared-capable device that runs Microsoft's PocketPC operating system, one popular example being Compaq's iPAQ family of PDAs.

Figure 9A:
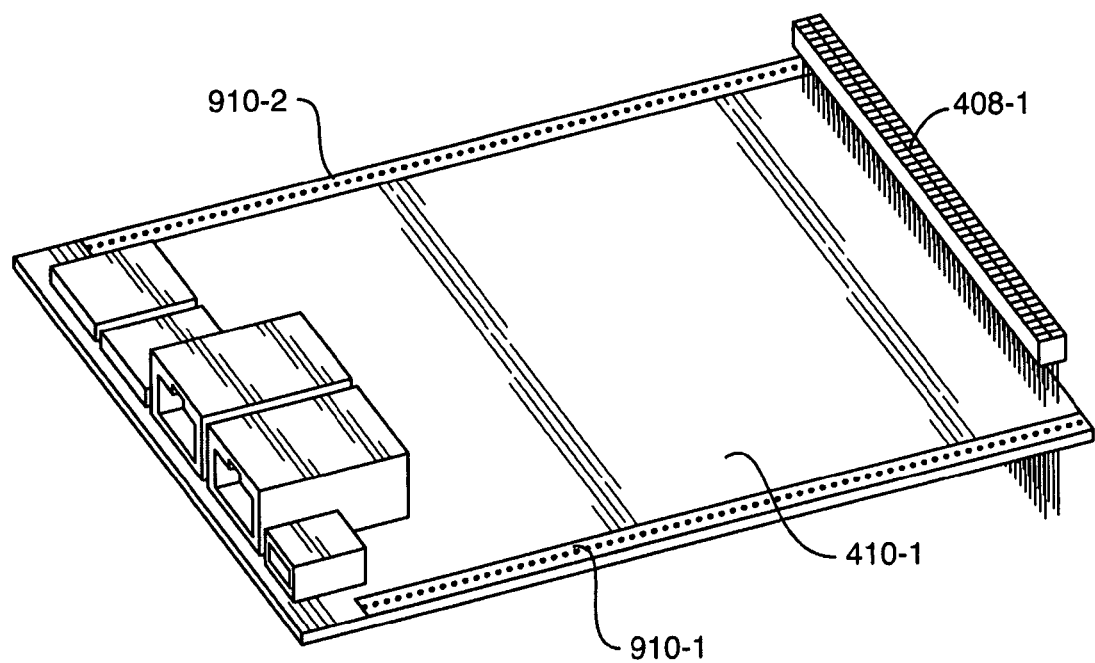
FIGS. 9A and 9B are diagrams of a circuit board in the data acquisition node according to an embodiment of the invention.
Figure 9B:
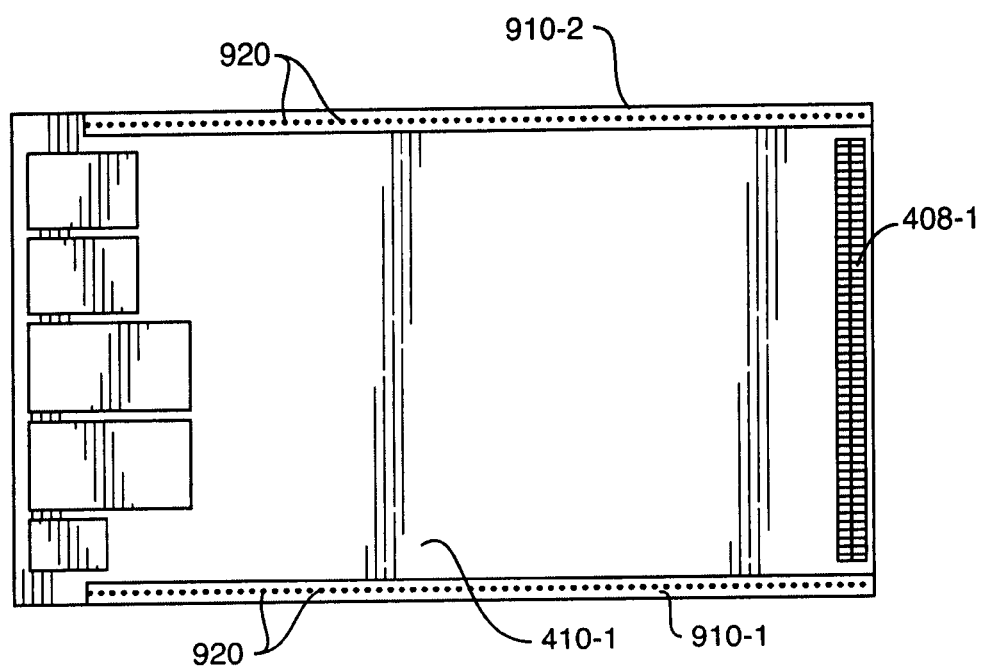

FIGS. 9A and 9B are diagrams of a circuit board 410-1 of data acquisition node 140-1 according to an embodiment of the invention. As shown, circuit board 410-1 includes heat sink regions 910-1 and 910-2 (e.g., conductive material on one or more layers of a PCB) disposed along its corresponding lengthwise edges. Connector 408-1 supports connectivity with other circuit boards in the assembly of stacked circuit boards 400 as previously discussed. Other circuit boards 410 in the assembly of stacked circuit boards 400 may include similar heat sink regions 910 on corresponding edges.

The housing 610 of data acquisition node 140-1 includes slots 650 for slidably receiving edges of circuit boards 410 in the assembly of stacked circuit boards 400. The edges of the circuit boards 410 (e.g., where the circuit boards 410 contact the housing 610) include heat sink regions 910 that support thermal conduction between the assembly of stacked circuit boards 400 and housing 610. In one application, the heat sink regions 910 are multiple patches of electrically conductive material disposed on separate layers of a corresponding circuit board 410. Vias or barrels 920 through the multiple heat sink regions 910 on the circuit board 410 further enhance conduction of heat from the rigid assembly of stacked circuit boards 400 to the slots 650 of housing 610 which dissipate heat.

Figure 10:
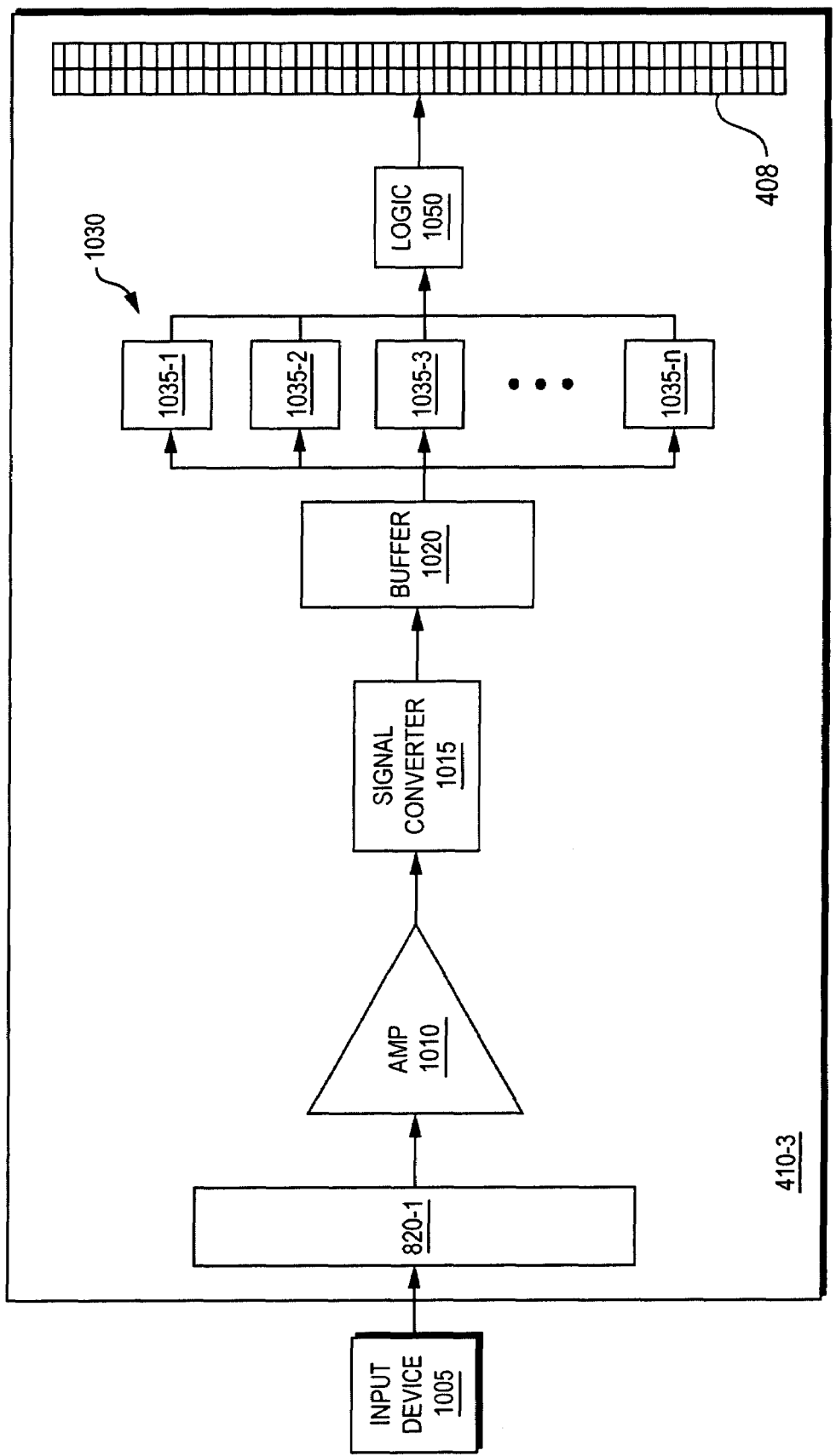
FIG. 10 is a diagram of an isolation circuit according to an embodiment of the invention.

FIG. 10 is a diagram of a circuit board 410-3 including an isolation circuit 1030 according to an embodiment of the invention. As shown, circuit board 410-3 includes connector 820-1, amplifier 1010, signal converter 1015, buffer 1020, isolation circuit 1030, isolation devices 1035-1, 1035-2, . . . , 1035-n, logic 1050, and connector 408.

During general operation, circuit board 410-3 of a data acquisition node 140 produces data associated with signals received from input device 1005 such as a sensor device that produces a low-level analog signal. Conductive path 1007 electrically couples input device 1005 (e.g., an external source) to connector 820-1 of circuit board 410-3. Amplifier 1010 receives the signal generated by input device 1005 through connector 820-1 produces output signal fed to signal converter 1015 such as an analog-to-digital converter. Buffer 1020 stores data generated by signal converter 1015. During operation, this configuration of circuit board 410-3 supports collection of data as signal converter 1015 converts the analog signal from input device 1005 into digital data.

According to further operations, the circuit board 410-3 forwards data collected from the input device 1005 to a processor board in the corresponding data acquisition node 140 assembly which, in turn, generates data packets including data as produced by circuit board 410-3. The processor device of the corresponding data acquisition node 140 forwards the data packets to the network interface for transmission over the network to another data acquisition node 140 or controller 135.

Circuit board 410-3 includes circuitry such as a data transfer circuit for transferring produced data to a processor circuit of data acquisition node 140 through connector 408. More specifically, isolation circuit 1030 includes isolation devices 1035 such as opto-couplers to isolate buffer 1020 and signal converter 1015 from logic 1050. The data transfer circuit supports transfer of the digital data produced by signal converter 1015 to a processor device and/or a network interface circuit in the assembly of circuit boards 400 for transmission of the digital data to other data acquisition nodes 140 or controller 135 as previously discussed.

In one embodiment, to increase accuracy of converting the received signal from input device 1005 into digital data, isolation devices 1035 isolate the signal converter 1015 from logic 1050 during a conversion mode. Logic 1050 disables clock signals associated with transferring data (and potentially other noise-producing signals on circuit boards 410-3) while the signal converter circuit converts the signal into the digital data. During non-conversion modes (e.g., when the signal converter 1015 is not actively converting an input signal into digital data), the clocks to buffer 1020 (and optionally signal converter 1015) are activated to transfer the digital data in buffer 1020 through isolation circuit 1030, logic 1050, and connector 408 to an off-board processing device that generates data packets for transmission from data acquisition node 140 over a network. Isolation of the signal converter 1015 and the technique of disabling clocks during a conversion mode reduces noise induced on the received signal from input device 1005 as well as noise imparted on signal converter 1015, thus increasing accuracy of collected data.

Figure 11:
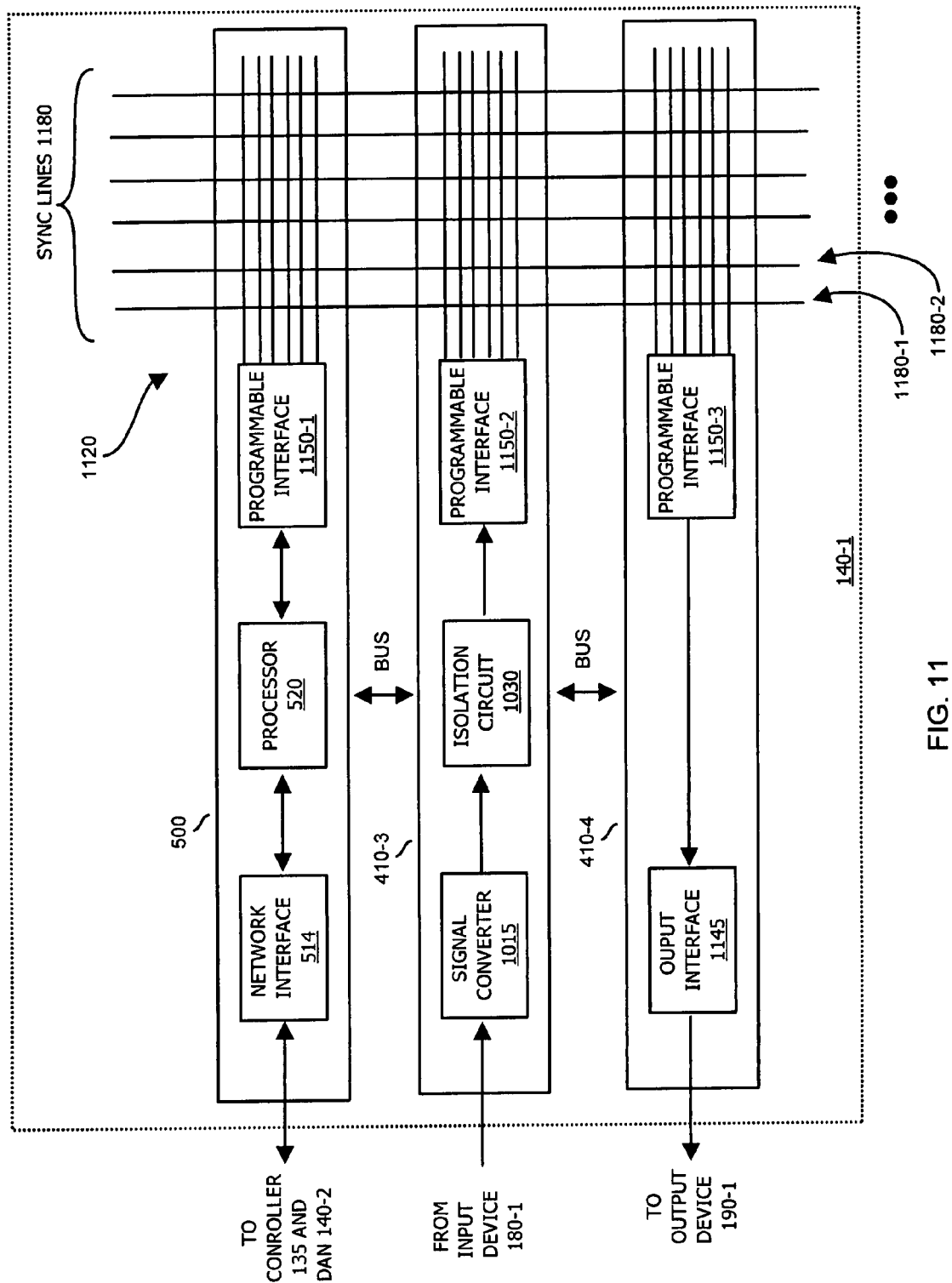
FIG. 11 is a circuit diagram of a synchronization circuit in a data acquisition node according to an embodiment of the invention.

FIG. 11 is a synchronization circuit 1120 of data acquisition node 140-1 according to an embodiment of the invention. As shown, data acquisition node 140-1 includes core module 500 (e.g., a combination of circuit boards 410-1 and 410-2), circuit board 410-3, and circuit board 410-4. Core module 500 includes network interface 514, processor 520, and programmable interface 1150-1. Circuit board 410-3 includes signal converter 1015, isolation circuit 1030, and programmable interface 1150-2. Circuit board 410-4 includes output interface 1145, and programmable interface 1150-3. Sync lines 1180 are accessible by each of circuit boards 410-3 and circuit board 410-4 as well as core module 500. Note that the circuitry shown is merely an example of how circuit boards may be configured. In other embodiments, functions such as those supported by circuit board 410-3 and circuit board 410-4 are combined on a single circuit board.

As previously discussed, data acquisition node 140-1 couples to input device 180-1 to receive input data. Data acquisition node 140-1 also couples to output device 190-1 to provide commands to control output device 190-1. The data received from input device 180-1 can be forwarded to circuit board 410-4, core module 500, and/or controller 135. Similarly, commands to control output device 190-1 may be generated by controller 135, core module 500, circuit board 410-3, and/or circuit board 410-4.

Data acquisition node 140-1 includes sync lines 1180 which are common to core module 500, circuit board 410-3 and circuit board 410-4 via respective programmable interfaces 1150. Use of sync lines 1180 and programmable interfaces 1150 enables user 120 to synchronize circuitry within data acquisition node 140-1 as well as synchronize data acquisition node 140-1 with other devices such as other data acquisition nodes 140 and/or controller 135. For example, in a specific application, core module 500 may generate a synchronization signal via processor 520. In such a case, processor 520 drives the synchronization signal through programmable interface and to a selected sync line such as sync line 1180-1. Programmable interfaces 1150-2 and 1150-3 of respective circuit boards 410-3 and 410-4 could be programmed to receive and monitor the sync signal on sync line 1180-1 for synchronization purposes. One method of programming programmable devices is through receipt of network messages from controller 135.

In another application, programmable interface 1150-2 is programmed to generate a sync pulse in response to detecting the occurrence of an event such as when a received analog signal from input device 180-1 crosses a voltage threshold value. The programmable interface 1150-2 drives a signal onto, for example, sync line 1180-2. Other circuits (such as core module 500 and circuit board 410-4) can be programmed to monitor sync line 1180-2 for state changes such as transitions from a logic high to low or vise-versa. Based on detection of a state change, core module 500 and/or circuit board 410-4 may perform some further response function. Thus, sync lines 1180 are well-suited to support other functions such as watchdogs, clocks, triggers.

Programmable interfaces 510 may be programmed to support other configurations as well as those discussed above.

Figure 12:
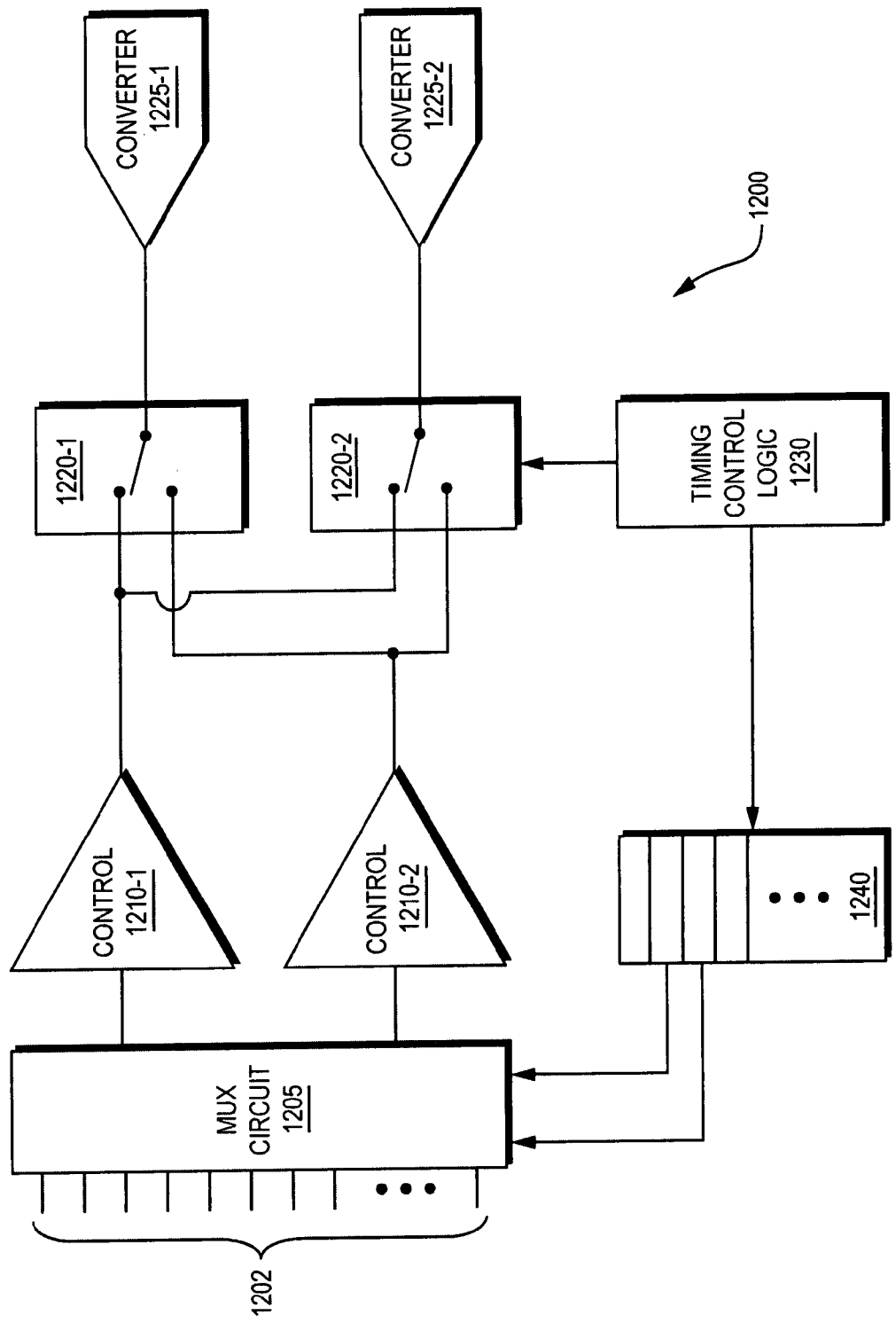
FIG. 12 is diagram of converter circuit 1200 according to an embodiment of the invention.

FIG. 12 is diagram of converter circuit 1200 according to an embodiment of the invention. As shown, converter circuit 1200 includes multiplexer circuit 1205, signal conditioner circuits 1210-1, 1210-2, switch circuits 1220-1, 1220-2, converters 1225-1, 1225-2 (e.g., A/D converter devices) timing control logic 1230, and channel list 1240. Converter circuit 1200 may be used on an I/O board of a data acquisition node 140.

During general operation of converter circuit 1200, timing control logic 1230 coordinates selection of signal 1202 through mux circuit 1205 to signal conditioner circuits 1210-1 and 1210-2. For example, a first channel (i.e., signal 1202) is driven through mux circuit 1205 to signal conditioner circuit 1210-1. Signal conditioner circuit 1210-2 conditions the signal to an appropriate level and drives switch circuit 1220-1. Switch circuit 1220-1 receives control signals from timing control logic 1230 for performing a conversion on an already settled input signal. Converter 1225-1 performs a conversion on the signal. During conversion of the signal at converter 1225-1, timing control logic 1230 selects (via channel list 1240) a second channel or signal 1202 to drive signal conditioner circuit 1210-2. Signal conditioner circuit 1210-2 drives second input of switch circuit as well as an input of switch circuit 1220-2. Thus, timing control logic 1230 may set up one channel for converting during conversion of another channel.

In one embodiment, the method of performing a conversion includes:

1.) Select one of signals 1202 to drive a signal conditioner circuit 1210-1.

2.) During conversion of first selected signal 1202, select a next channel for pre-charging and settling on a path.

3.) Acquire data.

4.) Switch A/D to next channel for second conversion.

5.) On channel previously converted, select next channel from channel list 1240 to begin settling time.

High channel density devices typically support multiplexing via mux circuit 1205 on the front end. The front end of converter circuit 1200 is analog circuitry that conditions signals (applies offset, gain correction; amplifies or attenuates signal). Front end typically includes multiple stages, such as three to five stages, each of which is built around an operational amplifier. While signals on a given channel propagate from one stage to another operational amplifiers and hence take time to settle at the end of a path. The settling time decreases maximum frequency we can switch circuitry from one channel to another. To make a measurement, the multiplexed front-end is switched from one channel to another and settles over the full swing within single conversion clock. This means that a slew rate should be quite high such as at least 10-20 times higher than data acquisition card signal bandwidth.

A limitation on circuit board space may not allow use of separate front-ends and converter for every channel. As shown, an embodiment of the invention is based on using multiple front-ends and fast low-voltage multiplexor at front of the single A/D. Input multiplexers 1205 are configured such a way to feed a signal 1202 into an A/D converter 1225 while settling a next channel on the other front end. This technique allows a shorter settling time by the number of front-ends located on the same board (also limited by board form-factor). Thus, according to an embodiment of the invention, each of signals 1202 can be converted based on selection of circuit paths between any of the two converters 1225. Converter circuit 1200 may include any number of signal conditioner circuits 1210, switch circuits 1220 and converters 1225.

Figure 13:
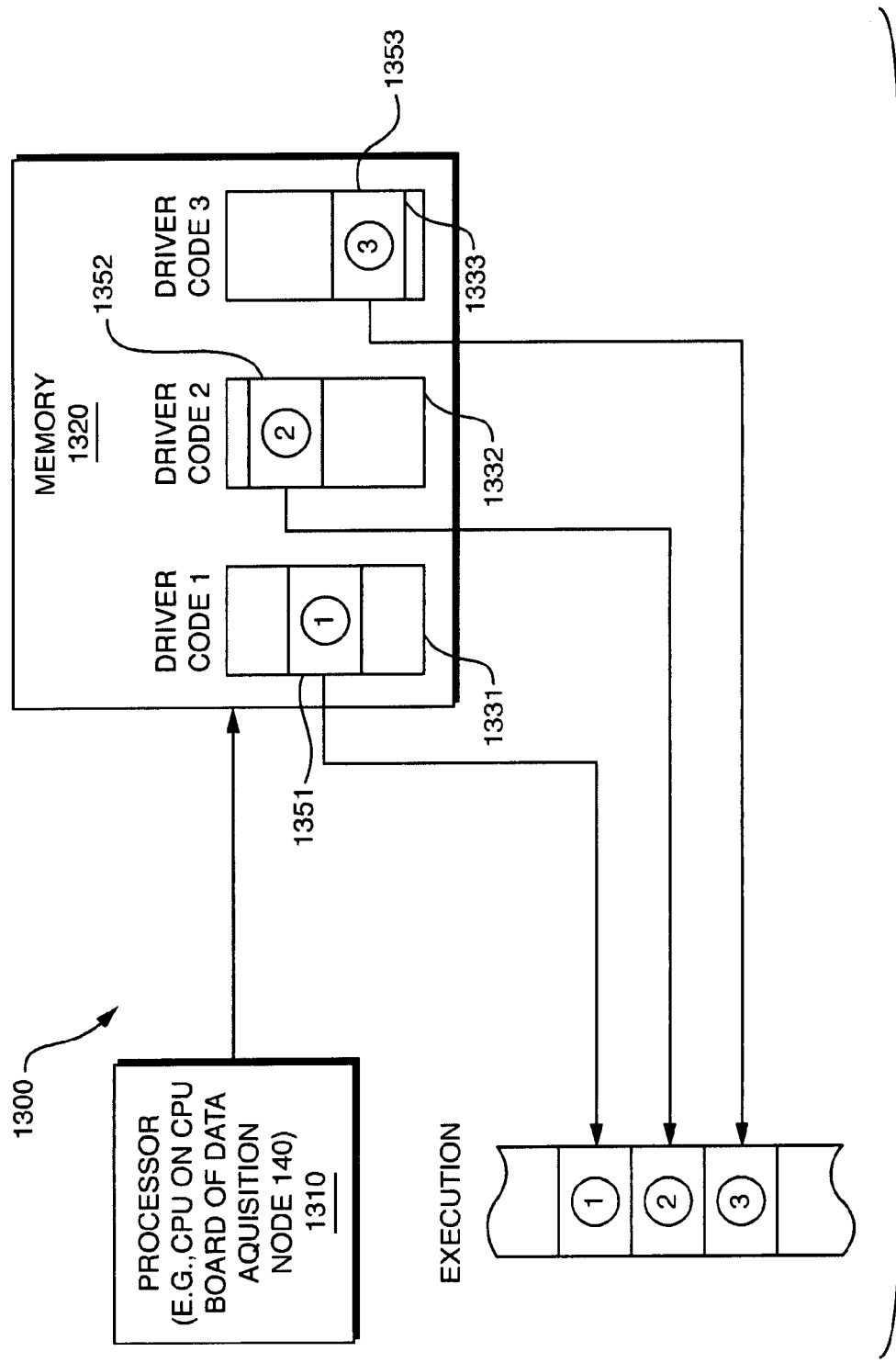
FIG. 13 is diagram of a technique for generating and executing code associated with a particular layer according to an embodiment of the invention.

FIG. 13 is diagram of a technique for generating and executing code associated with a particular layer according to an embodiment of the invention. As shown, circuit 1300 includes processor 1310 and memory 1320. Memory 1320 includes code 1331, 1332, and 1333 associated with respective functional aspects of different layers such as I/O layers in data acquisition node 140. Processor 1310 executes each driver for each I/O layer in the data acquisition node 140. Each driver produces specific machine code (e.g., code segments 1351, 1352, and 1353) to be executed contiguously in order by processor 1310.

Based on execution of code segments 1351, 1352, and 1353, input out device connected data acquisition node can be simultaneously (or near simultaneously) started and stopped. Thus, data can be acquired and at specific times in relation to output functions. In one embodiment, circuit 1300 is used in conjunction with circuit shown in FIG. 11 such as a synchronization interface. In summary, technique in FIG. 13 is used to dynamically generate a piece of assembly code or machine code (e.g., the code is low level requiring few clock cycles to perform) with data located in the operands. When software starts or stops an input or output device, processor 1310 executes this piece of generated on-the-fly code (which may vary over time). By generating the exact code (e.g., shortened code) on the fly and executing respective code segments 1, 2, and 3, device skewing can be reduced to a single clock cycle even without requiring use of more sophisticated synchronization techniques.

While this invention has been particularly shown and described with references to preferred embodiments thereof, it will be understood by those skilled in the art that various changes in form and details may be made therein without departing from the spirit and scope of the invention as defined by the appended claims. As such, the foregoing description of embodiments of the invention is not intended to be limiting.

What is claimed is:

1. A data acquisition node comprising:
    a first circuit board supporting communications over a network;
    a second circuit board coupled to at least one of:
        i) an input device, and
        ii) an output device;
    a connector interface coupling multiple conductors of the first circuit board to the second circuit board;
    the first circuit board including a corresponding first programmable interface coupled to the multiple conductors, the second circuit board including a corresponding second programmable interface coupled to the multiple conductors, configuration settings of the first programmable interface and the second programmable interface enabling conveyance of signals between the first circuit board and second circuit board;

wherein the first circuit board includes a first communication port supporting upstream communications and a second communication port to support downstream communications; and wherein the upstream communications include communications to a central controller and the downstream communications include communications to other data acquisition nodes in a data acquisition and control system; and wherein the first circuit board and corresponding first programmable interface, based on communications over the network from a remotely located controller, drives a signal to the second circuit board via at least one of the multiple conductors to synchronize the controller with functionality of the second circuit board.

2. A data acquisition node as in claim 1, wherein the input device is a sensor device that monitors characteristics of a specific region in proximity to the data acquisition node.

3. A data acquisition node as in claim 2, wherein the second circuit board forwards data acquired from the sensor device to the first circuit board for transmission over the network.

4. A data acquisition node as in claim 3, wherein the second circuit board includes an isolation circuit between the sensor device and the corresponding second programmable interface.

5. A data acquisition node as in claim 1, wherein the output device is activated based on commands received over the network.

6. A data acquisition node as in claim 1, wherein at least a portion of the multiple conductors supports synchronization between the first circuit board and the second circuit board.

7. A data acquisition node as in claim 6, wherein the first circuit board receives communications over the network indicating how to program the first programmable interface and the second programmable interface.

8. A data acquisition node as in claim 1, wherein the second circuit board and corresponding second programmable interface, based on events detected by the input device, drives a signal to the first circuit board via at least one of the multiple conductors to synchronize functionality of the second circuit board with a remotely located controller over the network.

9. A data acquisition node comprising:
a first circuit supporting communications over a network;
a second circuit coupled to at least one of:
  i) an input device, and
  ii) an output device;
a connector interface coupling multiple conductors of the first circuit to the second circuit;
the first circuit including a corresponding first programmable interface coupled to the multiple conductors, the second circuit including a corresponding second programmable interface coupled to the multiple conductors, configuration settings of the first programmable interface and the second programmable interface enabling conveyance of signals between the first circuit and second circuit;

wherein the first circuit includes a first communication port supporting upstream communications and a second communication port to supporting downstream communications; and wherein the upstream communications include communications to a central controller and the downstream communications include communications to other data acquisition nodes in a data acquisition and control system; and wherein the data acquisition node is part of a daisy chain of multiple data acquisition nodes; and wherein the first communication port of the data acquisition node connects to an upstream data acquisition node in the daisy-chain and the second communication port connects to a downstream data acquisition node in the daisy-chain.

10. A data acquisition node as in claim 9, wherein each of the upstream data acquisition node and the downstream data acquisition node support collection of data; and wherein the data acquisition node is configured to receive data collected from the downstream data acquisition node via the second communication port for conveyance through the first communication port through the upstream data acquisition node to the central controller.

11. A data acquisition node as in claim 10, wherein the downstream data acquisition node is coupled to at least one corresponding input device and at least one corresponding output device;

wherein the data acquisition node is configured to enable conveyance of message data derived from the at least one corresponding input device at the downstream data acquisition node through first communication port and the second communication port up the daisy-chain to the central controller;

the data acquisition node is configured to enable conveyance of control messages from the central controller down the daisy-chain through the first communication port and the second communication port to the at least one corresponding output device at the downstream data acquisition node.

12. A data acquisition node as in claim 9, wherein the data acquisition node, the upstream data acquisition node, and the downstream data acquisition node each have assigned a corresponding different time slot on the daisy-chain to communicate data on the daisy-chain upstream to the central controller.

13. A data acquisition node as in claim 12, wherein the central controller is configured to selectively vary an amount of bandwidth allocated on the daisy-chain for use by the data acquisition node to communicate data upstream to the central controller.

14. A data acquisition node as in claim 12, wherein the central controller is configured to broadcast a network message downstream on the daisy-chain to each data acquisition node on the daisy-chain to indicate when each data acquisition node on the daisy-chain is permitted to transmit data upstream to the central controller as well as indicate a permitted response size for each data acquisition node.

* * * * *